(12) United States Patent
Wolfond et al.

(10) Patent No.: US 12,524,763 B2
(45) Date of Patent: Jan. 13, 2026

(54) SYSTEMS AND METHODS FOR CREDENTIAL-BASED TRANSACTIONS OVER A NETWORK INCORPORATING TRANSACTION CODES

(71) Applicant: Avast Software s.r.o., Prague (CZ)

(72) Inventors: Gregory Wolfond, Toronto (CA); Drummond Reed, Seattle, WA (US); Brent Zundel, American Fork, UT (US); Allan Thomson, Pleasanton, CA (US)

(73) Assignee: Avast Software s.r.o., Prague (CZ)

( * ) Notice: Subject to any disclaimer, the term of this patent is extended or adjusted under 35 U.S.C. 154(b) by 0 days.

(21) Appl. No.: 18/446,068

(22) Filed: Aug. 8, 2023

(65) Prior Publication Data
US 2025/0053974 A1     Feb. 13, 2025

(51) Int. Cl.
| G06Q 20/40 | (2012.01) |
| G06Q 20/38 | (2012.01) |
| H04L 9/40 | (2022.01) |

(52) U.S. Cl.
CPC ....... G06Q 20/401 (2013.01); G06Q 20/3821 (2013.01); G06Q 20/3825 (2013.01);
(Continued)

(58) Field of Classification Search
CPC ............. G06Q 20/401; G06Q 20/3825; G06Q 20/3821; G06Q 20/3829; G06Q 20/389;
(Continued)

(56) References Cited

U.S. PATENT DOCUMENTS

| 5,825,880 A | 10/1998 | Sudia et al. |
| 6,327,578 B1 | 12/2001 | Linehan |

(Continued)

FOREIGN PATENT DOCUMENTS

| CN | 109716373 A | 5/2019 | |
| EP | 4254234 A1 * | 10/2023 | ............. G06F 21/44 |

(Continued)

OTHER PUBLICATIONS

Machine Translation of EP 4254234 A1 (Year: 2023).*
(Continued)

*Primary Examiner* — James D Nigh
(74) *Attorney, Agent, or Firm* — Dovas Law, P.C.

(57) ABSTRACT

Systems and methods for transacting over a network is provided. The system includes a first agent and second agent. The first agent is operable to receive from a third agent a transaction code associated with one or more credential types required to apply the transaction code or with one or more credential claim types required to apply the transaction code, transmit the transaction code to the second agent, and receive from the second agent a digitally signed transaction, a first verifiable proof, and the transaction code. The first agent is further operable to transmit to a fourth agent a second verifiable proof based on the first verifiable proof and the transaction code, receive from the fourth agent an unlock signature for a locked credential including one or more credential claims, and transmit the unlock signature to the second agent.

32 Claims, 13 Drawing Sheets

(52) U.S. Cl.
CPC ....... *G06Q 20/3829* (2013.01); *G06Q 20/387* (2013.01); *G06Q 20/389* (2013.01); *H04L 63/0428* (2013.01); *H04L 63/061* (2013.01); *H04L 63/123* (2013.01)

(58) Field of Classification Search
CPC .. H04L 63/0428; H04L 63/061; H04L 63/123
USPC .......................................................... 705/75
See application file for complete search history.

(56) References Cited

U.S. PATENT DOCUMENTS

| | | | |
|---|---|---|---|
| 8,316,237 | B1 | 11/2012 | Felsher et al. |
| 10,373,158 | B1 | 8/2019 | James et al. |
| 11,139,955 | B1 | 10/2021 | So et al. |
| 11,184,395 | B1 | 11/2021 | Novotny et al. |
| 2002/0188490 | A1 | 12/2002 | Kruse |
| 2003/0158820 | A1 | 8/2003 | Mathur et al. |
| 2009/0300747 | A1 | 12/2009 | Ahn |
| 2014/0281491 | A1 | 9/2014 | Zaverucha et al. |
| 2015/0095999 | A1 | 4/2015 | Toth |
| 2019/0097812 | A1 | 3/2019 | Toth |
| 2020/0127845 | A1 | 4/2020 | Yang et al. |
| 2020/0136921 | A1 | 4/2020 | Doshi |
| 2020/0302441 | A1 | 9/2020 | Collinge et al. |
| 2021/0014060 | A1 | 1/2021 | Giorgiadis et al. |
| 2021/0287770 | A1 | 9/2021 | Anderson et al. |
| 2022/0272085 | A1 | 8/2022 | Novotny et al. |
| 2022/0329653 | A1 | 10/2022 | Govindarajan et al. |
| 2023/0259922 | A1 | 8/2023 | Rao et al. |
| 2024/0187238 | A1* | 6/2024 | Pourtabatabaie ..... H04L 9/3231 |

FOREIGN PATENT DOCUMENTS

| | | | |
|---|---|---|---|
| JP | 2019-525645 | 9/2019 | |
| JP | 2021111412 | 8/2021 | |
| WO | WO2018031856 | 2/2018 | |
| WO | WO2019191213 | 10/2019 | |
| WO | WO-2020233236 A1 * | 11/2020 | ............. G06Q 40/04 |
| WO | WO2022096126 | 5/2022 | |
| WO | WO2022102930 | 5/2022 | |

OTHER PUBLICATIONS

Machine Translation of WO 2020233236 A1 (Year: 2020).*
"Decentralized identity and verifiable credentials", Microsoft Security, Sep. 28, 2022, 11 pages (Year: 2022).*
Aries RFC 0046: Mediators and Relays, Daniel Hardman, Dec. 1, 2018 through Feb. 1, 2019, GitHub, https://github.com/hyperledger/aries-rfcs/blob/main/concepts/0046-mediators-and-relays/README.md, accessed Sep. 14, 2023.
Aries RFC 0478: Coprotocols, Daniel Hardman, Feb. 3, 2020 through May 19, 2020, GitHub, https://github.com/hyperledger/aries-rfcs/blob/main/concepts/0478-coprotocols/README.md, accessed Sep. 14, 2023.
Aries RFC 0075: Payment Decorators, Sam Curren et al., Apr. 22, 2019 through Jun. 11, 2019,GitHub, https://github.com/hyperledger/aries-rfcs/tree/main/features/0075-payment-decorators, accessed Sep. 14, 2023.
Aries RFC 0453: Issue Credential Protocol 2.0, Nikita Khateev et al., Mar. 23, 2020 through Apr. 15, 2021, GitHub, https://github.com/hyperledger/aries-rfcs/tree/main/features/0453-issue-credential-v2, accessed Sep. 28, 2023.
Aries RFC 0454: Present Proof Protocol 2.0, Nikita Khateev et al., May 27, 2020 through Apr. 15, 2021, GitHub, https://github.com/hyperledger/aries-rfcs/tree/main/features/0454-present-proof-v2, accessed Sep. 14, 2023.
Aries RFC 0004: Agents, Daniel Hardman, Nov. 1, 2017 "(approx, backdated)" through Jan. 15, 2019, GitHub, https://github.com/hyperledger/aries-rfcs/tree/main/concepts/0004-agents, accessed Sep. 14, 2023.
DIDComm Messaging v2.x Editor's Draft, Sam Curren et al., The Decentralized Identity Foundation, https://identity.foundation/didcomm-messaging/spec/, accessed Sep. 14, 2023.
Credential.md, Dmitry Khovratoavich et al., GitHub, https://github.com/sovrin-foundation/protocol/blob/master/themis/credential.md, accessed Sep. 14, 2023.
International Search Report dated Oct. 24, 2023 for International Patent Application No. PCTUS2370319.
U.S. Appl. No. 17/872,250, filed Jul. 25, 2022.
International Patent Application No. PCTUS2370319 filed Jul. 17, 2023.
U.S. Appl. No. 18/052,752, filed Nov. 4, 2022.
U.S. Appl. No. 18/063,284, filed Dec. 8, 2022.
U.S. Appl. No. 18/066,213, filed Dec. 14, 2022.
Alex Preukschat; Drummond Reed, Self-Sovereign Identity: Decentralized digital identity and verifiable credentials, Manning, 2021.
Phillip J. Windley, How Sovrin Works, Oct. 3, 2016, Sovrin.org.
Dmitry Khovratovich; Jason Law, Sovrin: Digital Identities in the Blockchain Era, Dec. 2016, Sovrin.org.
Daniel Hardman, How DIDs, Keys, Credentials, and Agents Work in Sovrin, Apr. 2018, Sovrin.org.
Japanese Office Action dated Jul. 8, 2025 for Japanese Patent Application No. 2025-504595 including English translation of Office Action.
Machine translation of JP2019525645.
Machine translation of WO2022102930.
Machine translation of JP2021111412.
Machine translation of CN109716373A.
Reply dated Aug. 4, 2025 for U.S. Appl. No. 17/872,250.
Office Action dated Feb. 13, 2025 for U.S. Appl. No. 18/066,213.
Reply dated Apr. 9, 2025 for U.S. Appl. No. 18/066,213.
Notice of Allowance dated May 30, 2025 for U.S. Appl. No. 18/066,213.
Office Action dated Mar. 21, 2025 for U.S. Appl. No. 18/063,284.
Reply dated May 23, 2025 for U.S. Appl. No. 18/063,284.
Notice of Allowance dated Jun. 20, 2025 for U.S. Appl. No. 18/063,284.
Office Action dated Nov. 27, 2024 for U.S. Appl. No. 17/872,250.
Reply dated Jan. 22, 2025 for U.S. Appl. No. 17/872,250.
Office Action dated May 16, 2025 for U.S. Appl. No. 17/872,250.
Office Action dated Nov. 14, 2024 for U.S. Appl. No. 18/052,752.
Updated Office Action dated Dec. 3, 2024 for U.S. Appl. No. 18/052,752.
Reply dated Jan. 22, 2025 for U.S. Appl. No. 18/052,752.
Notice of Allowance dated May 14, 2025 for U.S. Appl. No. 18/052,752.

* cited by examiner

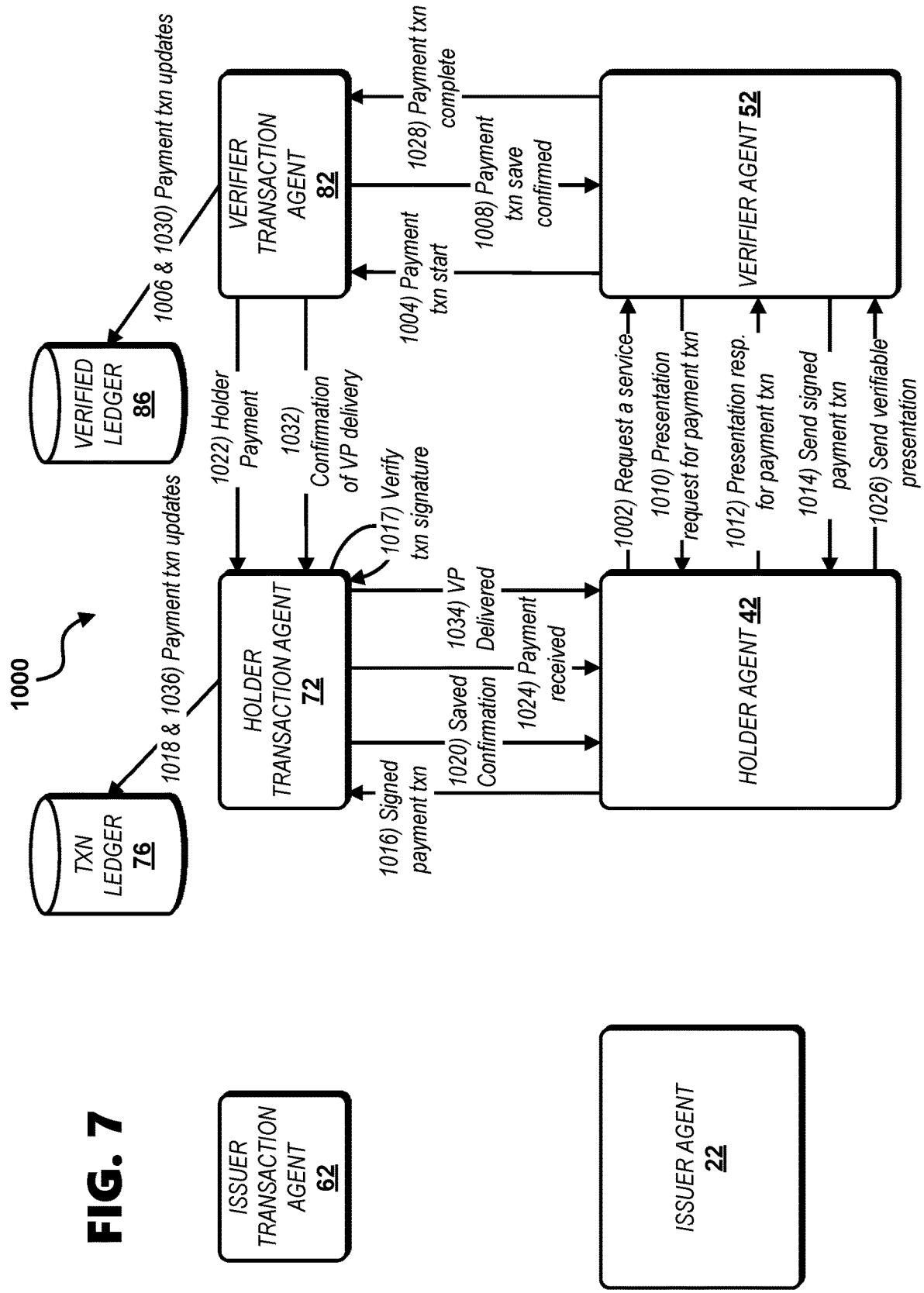

ERROR a second agent a request to initiate a use of a network-accessible service, transmitting to the second agent a request for one or more data points that supports verification of an entity to initiate the use of the network-accessible service, and generating a digitally signed transaction for the request to initiate the use of the network-accessible service. The method further includes receiving from the second agent a first verifiable proof, the first verifiable proof based on a locked credential and including the one or more data points and comparing the locked credential to the one or more credential types required to apply the transaction code to determine that the locked credential matches the one or more credential types required to apply the transaction code. The method further includes applying the transaction code to the digitally signed transaction responsive to the determining that the locked credential matches the one or more credential types required to apply the transaction code, transmitting to the first agent the digitally signed transaction, the first verifiable proof, and the transaction code, receiving from the first agent an unlock signature for the locked credential, and unlocking the first verifiable proof using the unlock signature.

Another system for transacting over a network is provided. The system includes a first agent and a second agent. The first agent is operable to receive from a third agent a transaction code associated with one or more credential types required to apply the transaction code or with one or more credential claim types required to apply the transaction code, to transmit the transaction code to the second agent, and to receive from the second agent a digitally signed transaction, a first verifiable proof, and the transaction code. The first agent is further operable to transmit to a fourth agent a second verifiable proof based on the first verifiable proof and the transaction code, receive from the fourth agent an unlock signature for a locked credential including one or more credential claims, and transmit the unlock signature to the second agent. The second agent is operable to receive from a fifth agent a request to initiate a use of a network-accessible service, transmit to the fifth agent a request for one or more data points that support verification of an entity to initiate the use of the network-accessible service, and receive from the fifth agent the first verifiable proof, the first verifiable proof based on the locked credential or the one or more credential claims of the locked credential and including the one or more data points. The second agent is further operable to compare the locked credential to the one or more credential types required to apply the transaction code or compare the one or more credential claims of the locked credential to the one or more credential claim types required to apply the transaction code to determine that the locked credential matches the one or more credential types required to apply the transaction code or to determine that the one or more credential claims of the locked credential matches the one or more credential claim types required to apply the transaction code, apply the transaction code to the digitally signed transaction responsive to the determining that the locked credential matches the one or more credential types required to apply the transaction code or the one or more credential claims of the locked credential matches the one or more credential claim types required to apply the transaction code, and unlock the first verifiable proof using the unlock signature.

Yet another method for transacting over a network is provided. The method includes receiving from a first agent a transaction code associated with one or more credential types required to apply the transaction code or with one or more credential claim types required to apply the transaction code, receiving from a second agent a request to initiate a use of a network-accessible service, and transmitting to the second agent a request for one or more data points that supports verification of an entity to initiate the use of the network-accessible service. The method further includes generating a digitally signed transaction for the request to initiate the use of the network-accessible service, receiving from the second agent a first verifiable proof, the first verifiable proof based on a locked credential including one or more credential claims, and the first verifiable proof including the one or more data points, and comparing the locked credential to the one or more credential types required to apply the transaction code or comparing the one or more credential claims of the locked credential to the one or more credential claim types required to apply the transaction code to determine that the locked credential matches the one or more credential types required to apply the transaction code or to determine that the one or more credential claims of the locked credential matches the one or more credential claim types required to apply the transaction code. The method further includes applying the transaction code to the digitally signed transaction responsive to the determining that the locked credential matches the one or more credential types required to apply the transaction code or the one or more credential claims of the locked credential matches the one or more credential claim types required to apply the transaction code, transmitting to the first agent the digitally signed transaction, the first verifiable proof, and the transaction code, receiving from the first agent an unlock signature for the locked credential, and unlocking the first verifiable proof using the unlock signature.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein.

Figure 5A:
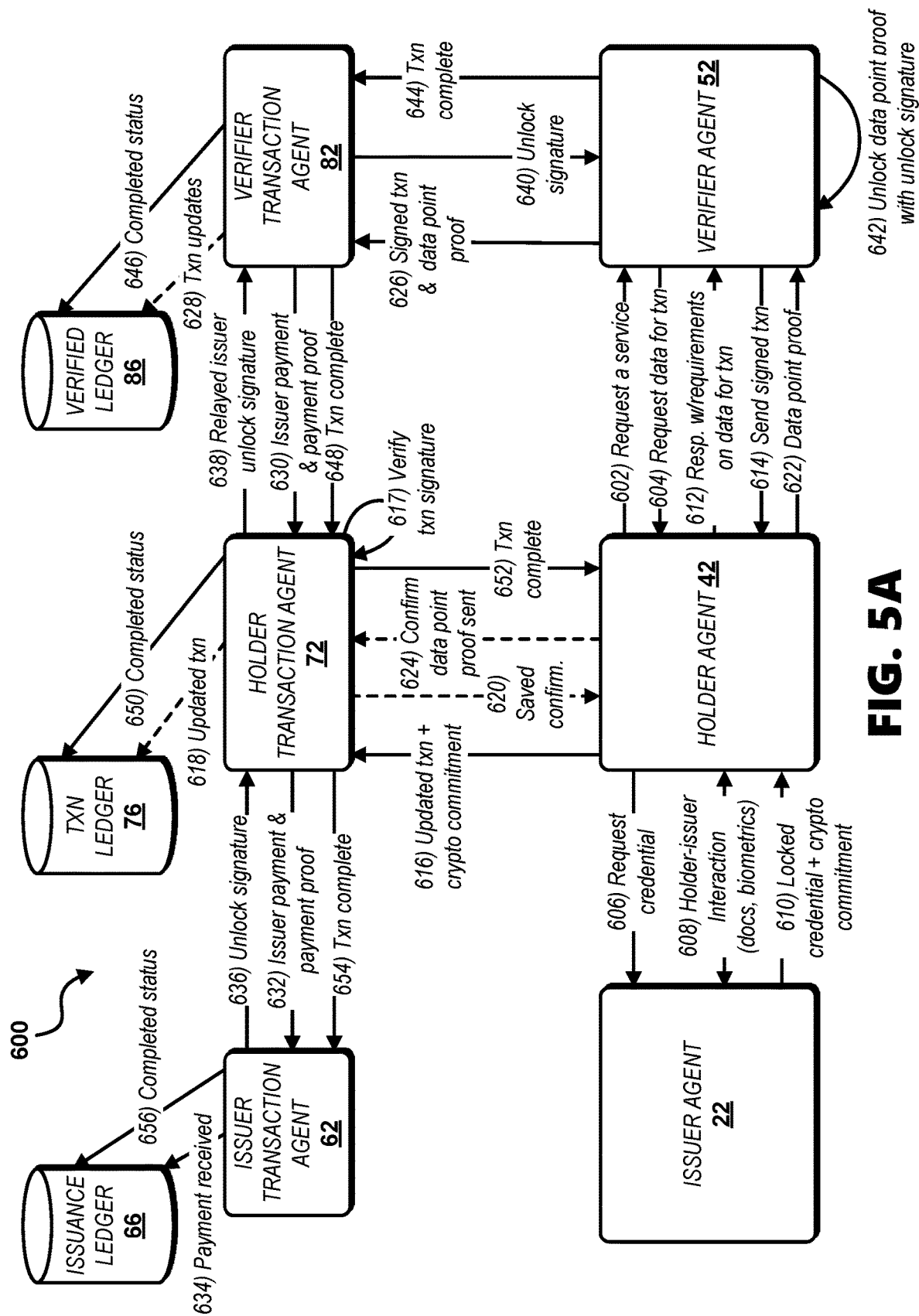
Figure 5B:
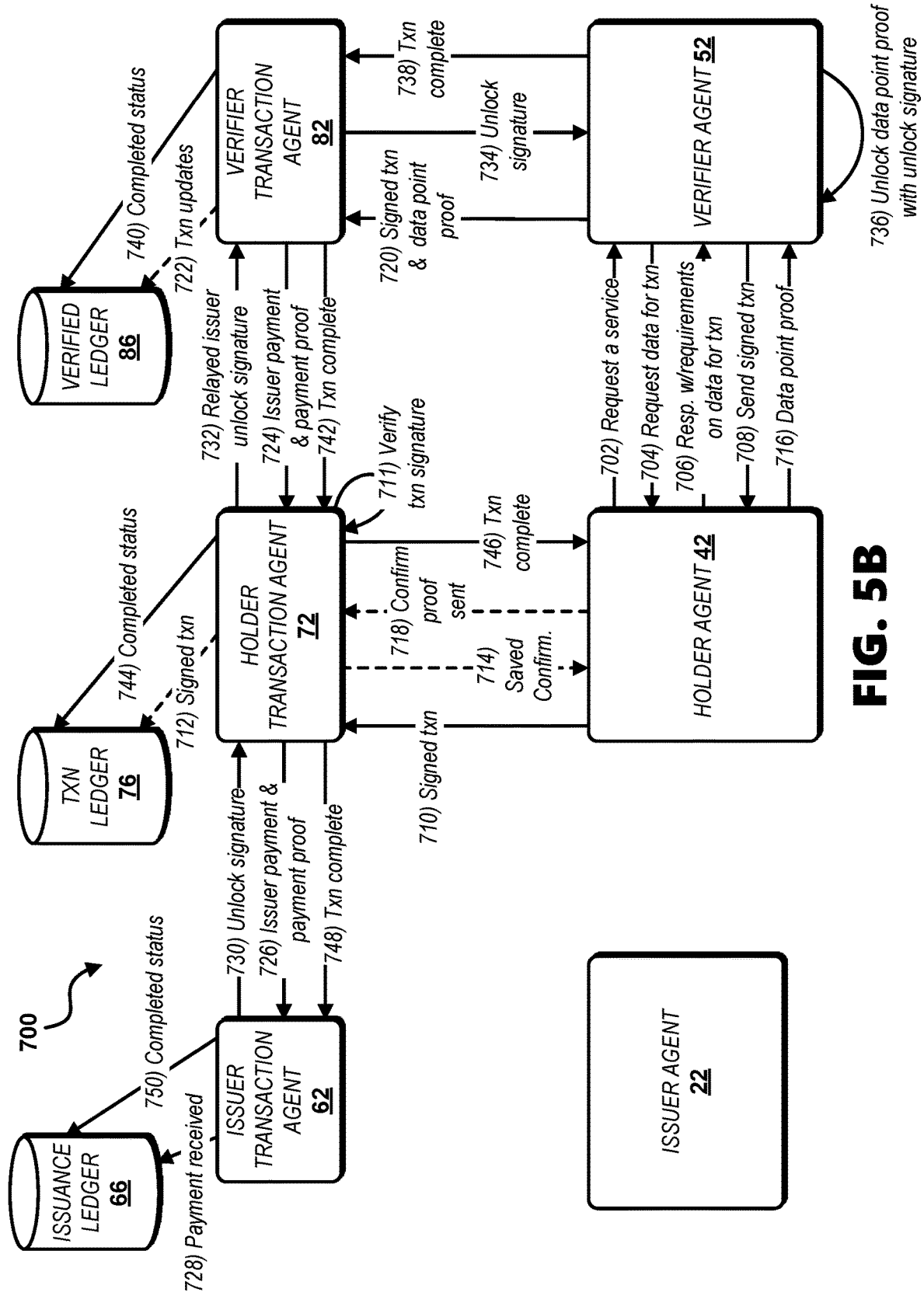

FIGS. 5A, 5B. 6A, 6B, and 7-10 show process flows and systems enabling transacting over a network via agents in a self-sovereign identity ("SSI") system environment.

Figure 11:
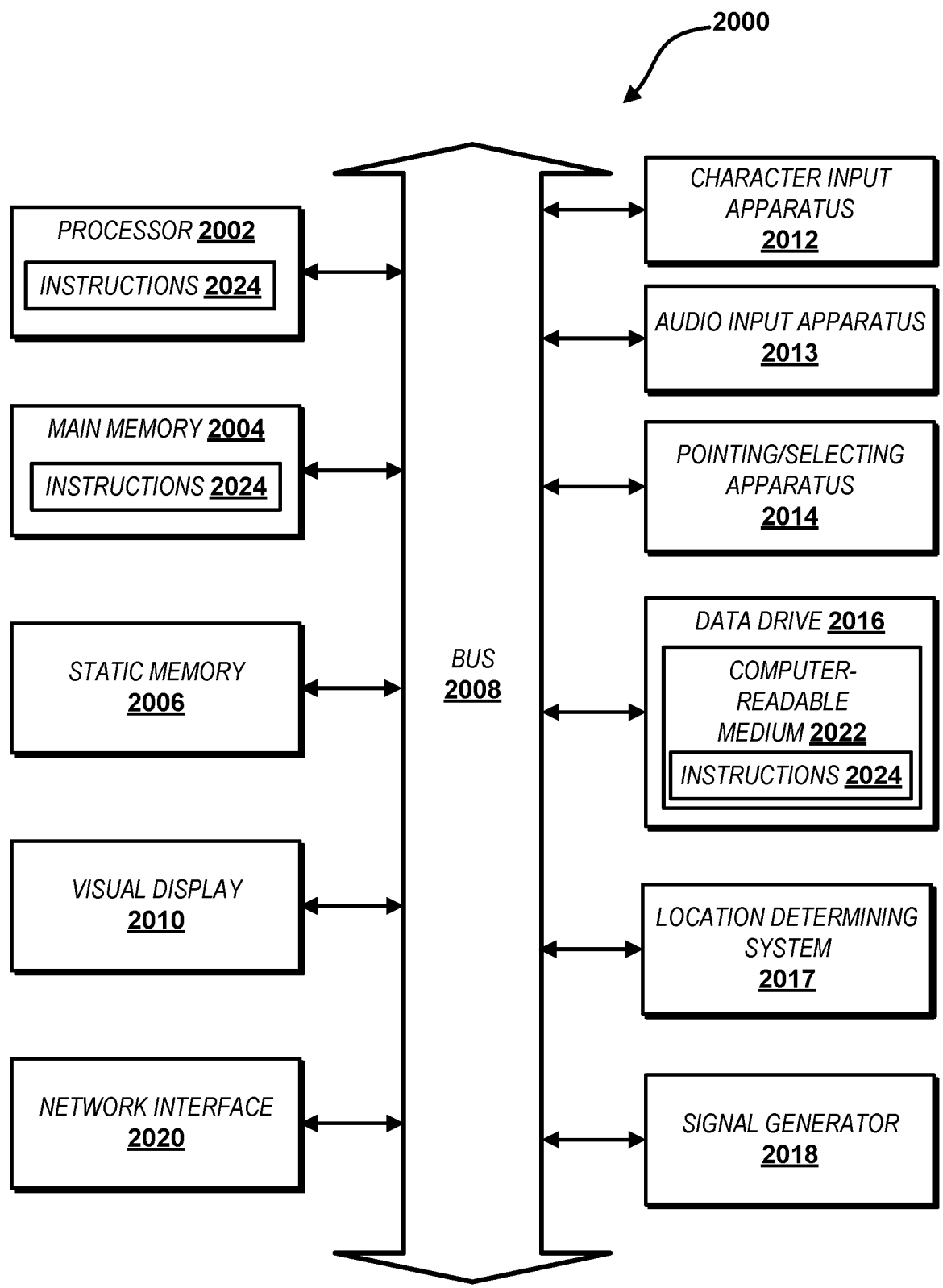

FIG. 11 shows a computer system for performing described methods according to illustrative embodiments.

DETAILED DESCRIPTION OF ILLUSTRATIVE EMBODIMENT(S)

There are limitations in current self-sovereign identity ("SSI") infrastructure models with respect to secure processing of transactions. It is desirable to track, log, and audit SSI transactions in a privacy-respecting manner for security, monetization, loyalty, or other beneficial purposes. Described herein are systems and methods which introduce mechanisms to track and monetize the use of SSI infrastructure and services built on top of SSI infrastructure. Included herein are systems and methods that are additive to the base mechanisms for core SSI infrastructure requirements and do not fundamentally change the base mechanisms.

In self-sovereign identity ("SSI") systems, establishing trust between entities is a multi-layered problem. Cryptographically verifiable credentials and the content of the cryptographically verifiable credentials are important in the establishment of trust. The content of a cryptographically verifiable credential codifies one or more "credential claims" including one or more attributes of the credential, for example the credential holder's first name, last name, date of birth, credit card number, social security number, passport number, university transcript information, and professional credential information. A credential claim may fulfill a data point requested from a holder.

Discount codes are transaction codes typically entered during online checkout of a purchase or online registering for a service providing a monetary benefit. Also, a merchant may physically display a QR (quick-response) code and a user can scan the code with a mobile computing device via camera hardware of the device and a scanning application to initiate a network-enabled data flow for taking advantage of the discount. However, discount codes typically do not have any association with digital credentials required by an online merchant, nor is there any way for discount codes to be cryptographically protected by association to a specific set of credentials or credential claims required to use the discount code. Described herein are systems and methods enabling association of cryptographic codes with credentials and cryptographic protection of transaction codes including discount codes and other types of transaction codes, for example transaction codes providing other benefits such as redeemable reward points.

Terms set forth herein are described as follows:

An "issuer" is an entity issuing a verifiable credential or data artifact.

A "holder" is an entity that holds a verifiable credential or data artifact provided to them by issuer entities. A holder may hold the verifiable credential or the data artifact for example in a digital wallet.

A "verifier" is an entity verifying a data artifact furnished by a holder as part of a transaction and a provider of a service a holder wishes to engage with. A "verifier" can include, for example, an online merchant.

A "contract" defines what data artifacts are required from a requesting entity of a service before a provider is willing to fulfill the service to the requesting entity.

An "agent" is an application component, executed on a computing system, operating on behalf of an entity (e.g., a user or organization) to transact for the entity.

A "transaction agent" is an application component, executed on a computing system, that provides capabilities to track, communicate, aggregate, and interface on transactions leveraging credentials.

A "transaction agent service provider system" is a system (e.g., software or hardware system) that hosts one or more transaction agents and one or more transaction ledgers on behalf of holders, issuers, or verifiers that choose to implement the system. A transaction agent service provider system can take on a different role for each of an issuer, a holder, and a verifier. A transaction agent service provider system can also be described as a "transaction agent provider," "payment infrastructure," or "platform provider."

A "payment agent" is a transaction agent that provides payment functions.

A "sponsor" is an entity that sponsors (e.g., pays for) the issuing of a verifiable credential, thus crediting a user. A sponsor can be entitled to receive the major portion of the verifier's payment for verification of the credential. A sponsor can be an independent entity, or the sponsor can be a role of an issuer, a role of a holder's transaction agent service provider system, or role of a verifier.

A "locked credential" is a verifiable credential ("VC") that may be shared by a holder, but it cannot be verified by a verifier without unlocking. The unlocking may be cryptographic (e.g., a verifier needs to receive a cryptographic key to unlock the content or part of the content of the credential) or may be policy based (e.g., a verifier's agent must adhere to the policy and only unlock the credential for verification after the procedural conditions are met—e.g., payment is confirmed).

An "unlocked credential" is a verifiable credential that can be shared by a holder, which has previously been acquired from an issuer, and can be used multiple times by the holder for use in transactions where the credential is required without having to pay the issuer or notify the issuer of such use.

A "credential claim" is an attribute of a verifiable credential and includes a value. A verifiable credential includes one or more credential claims for example one or more of a credential holder's first name, last name, date of birth, credit card number, social security number, passport number, university transcript information, or professional credential information.

A "co-protocol" is an interaction between two entities (e.g., holder, verifier, or issuer) within a payment scheme for an action that requires payment.

A "use case" is an example in the real-world of how users, consumers, and computers engage with services and service providers.

A "transaction scheme" or "payment scheme" is a sequence of exchanges between entities in a transaction agent system to accomplish a use case.

A "transaction" or "txn" represents an exchange between two parties, whether free or paid for, for example to engage in a service delivered by one party to another requesting party, for example a purchase order.

A "cryptographic system flow" is a system flow describing transaction data exchanges wherein protection provided by a system is cryptographically enforced. That is, a verifiable credential is not made available for use in a transaction without the cryptographic proofs necessary to validate the signature on the credential.

A "policy system flow" is a system flow describing transaction data exchanges wherein the protection provided by a system is enforced by policies that are defined and deployed across the system. That is, a verifiable credential is not made available for use in a transaction without verification that the credential complies with the policies agreed within the entities of the system.

"Telemetry data" is activity data, status data, and settings information on a computing system. The telemetry data includes but is not limited to device security settings, application settings, installed applications, and user online behavior.

A "digital trust assessment service" is a system that determines assessments of an entity based on monitored network activity, telemetry data, or a combination thereof.

A "digital trust issuer service" is a system that receives a request for, generates, and issues a verifiable credential based on one or more assessments of an entity.

"Trust signals" are data including signals from which a level of trust or quality of reputation of an entity can be assessed, for example derived from monitored network activity or telemetry data related to an entity.

A "network-enabled service" is one or more of the hosting or support of an application via a computer network (e.g., wide area network, local area network, or internet), the delivery of an application or components thereof via a computer network, or the updating of an application via a computer network.

A "client" is a network-accessible application or process executed on a computing system.

As described herein, reference to "first," "second," and "third," components (e.g., a "first agent," a "second agent") or "particular" or "certain" or "primary" components or implementations (e.g., a "particular user," a "certain user," a "particular computing device", a "particular implementation") is not used to show a serial or numerical limitation or a limitation of quality but instead is used to distinguish or identify the various components and implementations.

Some steps and elements in the Figures are shown in dashed line to indicate that they are optional or that they may be removed without precluding the functioning of the corresponding process or system. Notwithstanding, there exist steps or elements in the Figures that are shown in solid line that may also be optional or removed without precluding the functioning of the corresponding process or system.

Figure 1:
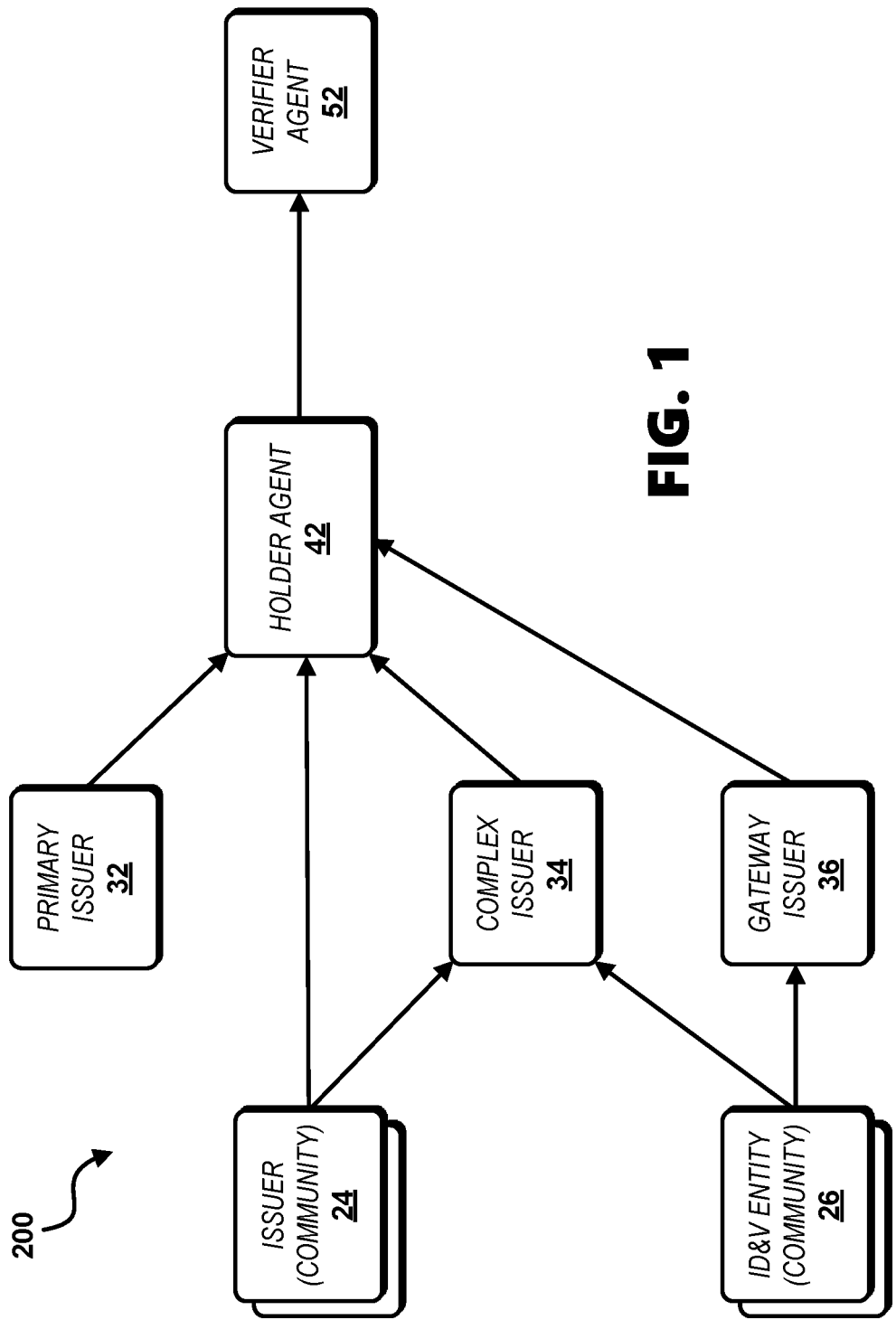
FIG. 1 shows a process flow and system in which data artifacts are provided by issuers to a holder agent and verified by a verifier agent.

Referring to FIG. 1, a process flow and system 200 enabled in a network environment is shown. Third-party data artifact issuers 24, for example a community of data artifact issuers 24, provide data artifacts (e.g., verifiable credentials) to a holder agent 42. The holder agent 42 can be provided in the form of a software agent including software encompassing a digital wallet holding issued data artifacts belonging to a user (i.e., "holder") of the holder agent 42, as well as software applications and network stack necessary to support the use of the digital wallet.

A primary issuer 32 is also enabled to provide data artifacts to the holder agent 42. A complex issuer 34 acts in partnership with other issuers including third-party data artifact issuers 24 and identification and verification ("ID&V") entities 26 in an ("ID&V community") to produce data artifacts for the holder agent 42. A gateway issuer 36 acts on behalf of the ID&V entities 26 to issue data artifacts to the holder agent 42. The primary issuer 32, complex issuer 34, and gateway issuer 36 are for example enabled by the same entity that enables a software agent forming the holder agent 42. A verifier agent 52 interfaces with the holder agent 42 to verify data artifacts.

Figure 2:
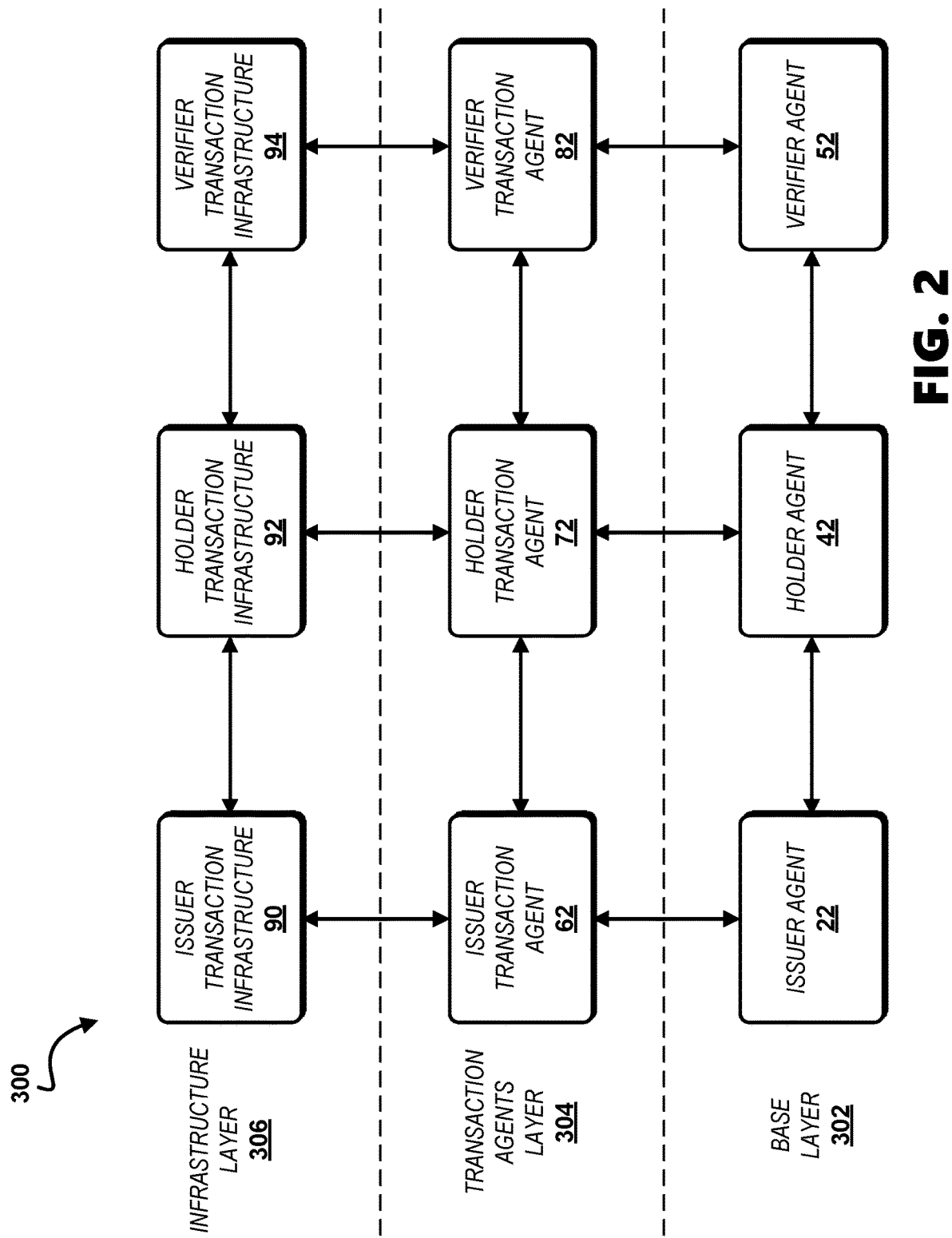
FIG. 2 shows a self-sovereign identity ("SSI") system and corresponding infrastructure layer, transaction agents layer, and base layer.

Referring to FIG. 2, a self-sovereign identity ("SSI") system 300 is provided. For privacy reasons, it is not desirable for a holder and issuer (e.g., via holder agent 42 and issuer agent 22) to communicate directly when implementing verifiable credentials. For purposes of illustration, if a driver license issued by a state's department of motor vehicles ("DMV") were a verifiable credential and was used by a holder to obtain access to various nightclubs, the holder may not want the DMV to be informed of their visits to the nightclubs in order to verify their driver license. The SSI system 300 supports a holder's privacy via a transaction layer 304 by allowing a holder via a holder agent 42 to use verifiable credentials (even locked credentials) without issuers of the credentials becoming aware of where the credentials are being used. The SSI system 300 further supports via the transaction layer 304 cryptographically tracking a proof of a transaction, for example for the purpose of auditing and tracking payments associated with the transaction.

A base layer 302 defines base components of the SSI system 300. The transaction layer 304 defines components handling the processing of payments associated with transactions and includes an issuer transaction agent 62, a holder transaction agent 72, and a verifier transaction agent 82. An infrastructure layer 306 defines services necessary to support the base layer 302 and the transaction layer 304. The infrastructure layer includes issuer transaction infrastructure 90, holder transaction infrastructure 92, and verifier transaction infrastructure 94.

The base layer includes an issuer agent 22, which includes one or more of a third-party data artifact issuer 24, ID&V entity 26, primary issuer 32, complex issuer 34, or gateway issuer 36. The starting point of a transaction occurs when a holder corresponding to a holder agent 42 with an existing issued verifiable credential wants and attempts to use a verified service. A data flow between the holder agent 42, the verifier agent 52, and one or more of the transaction agents 62, 72, 82 follows on the basis of a per transaction payment.

Figure 3:
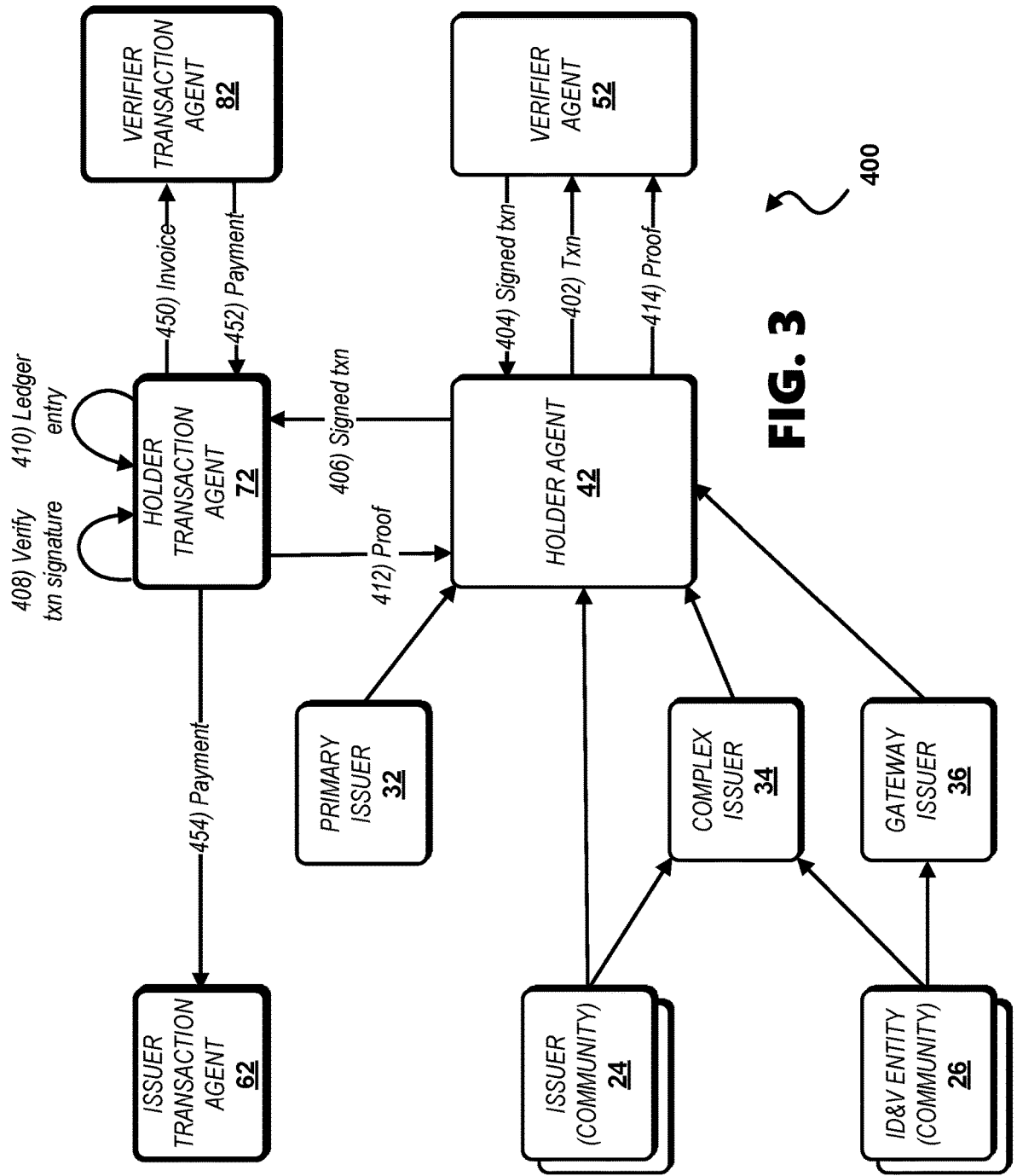
FIG. 3 shows a process flow and system in which data artifacts are provided by issuers to a holder agent and verified by a verifier agent with transactions facilitated by transaction agents.

A challenge to the SSI system 300 arises where providers of software and services enabling transactions or services via the SSI system 300 want to track, audit, and monetize the transactions or services, for example to enhance system security and usability and to protect privacy of a holder's use of credentials. Referring to FIGS. 2 and 3, as a solution to the challenge, the transaction agent architecture introduces three functional roles to the process flow and system 200 as set forth in the SSI system 300 to enable a process flow and system 400. The three functional roles include transaction agent roles enabled by the issuer transaction agent 62, holder transaction agent 72, and verifier transaction agent 82.

The issuer transaction agent 62 provides tracking of transactions that the issuer transaction agent 62 is engaged in, including monetization, back to the issuer agent 22 based on transactions of holders and verifiers (via holder agent 42 and verifier agent 52 respectively) without requiring the issuer (via issuer agent 22) to be involved in the transactions, wherein the issuer agent 22 can include one or more of the third-party data artifact issuer 24, ID&V entity 26, primary issuer 32, complex issuer 34, or gateway issuer 36. The holder transaction agent 72 provides tracking of transactions that the holder transaction agent 72 is engaged in, including monetization, occurring by the holder agent 42 (e.g., a software agent) back to the provider of services enabling the holder agent 42 (e.g., software agent services), for example a security services provider. The verifier transaction agent 82 provides monetization of the transactions to the verifier agent 52 including transaction invoicing and tracking services for transactions that the verifier transaction agent 82 is engaged in. The issuer transaction agent 62, holder transaction agent 72, and verifier transaction agent 82 maintain separate lines of communication and tracking to enable system security and usability and to protect privacy of a holder's use of credentials.

The process flow and system 400 includes a per transaction flow represented by steps 402 through 414. In the step 402, the holder agent 42 sends a transaction to the verifier agent 52, for example a transaction including a verifiable credential of the holder of the holder agent 42. The verifier agent 52 signs and returns the transaction to the holder agent 42 (step 404). The holder agent 42 sends the signed transaction to the holder transaction agent 72 (step 406). The holder transaction agent 72 verifies the signature, for example by application of a public key of the verifier agent 52 (step 408). The holder transaction agent 72 creates a transaction ledger entry (step 410). The holder transaction agent 72 sends back a proof for the transaction ("transaction proof") to the holder agent 42 (step 412). The holder agent 42 sends the transaction proof to the verifier agent 52 (step 414).

The process flow and system 400 further includes an asynchronous, in batch process flow and system represented by steps 450 through 454. In the step 450, the holder transaction agent 72 sends an invoice to the verifier transaction agent 82. The verifier transaction agent 82 send payment to the holder transaction agent 72 (step 452), and the holder transaction agent 72 pays the issuer transaction agent 62 (step 454).

Figure 4:
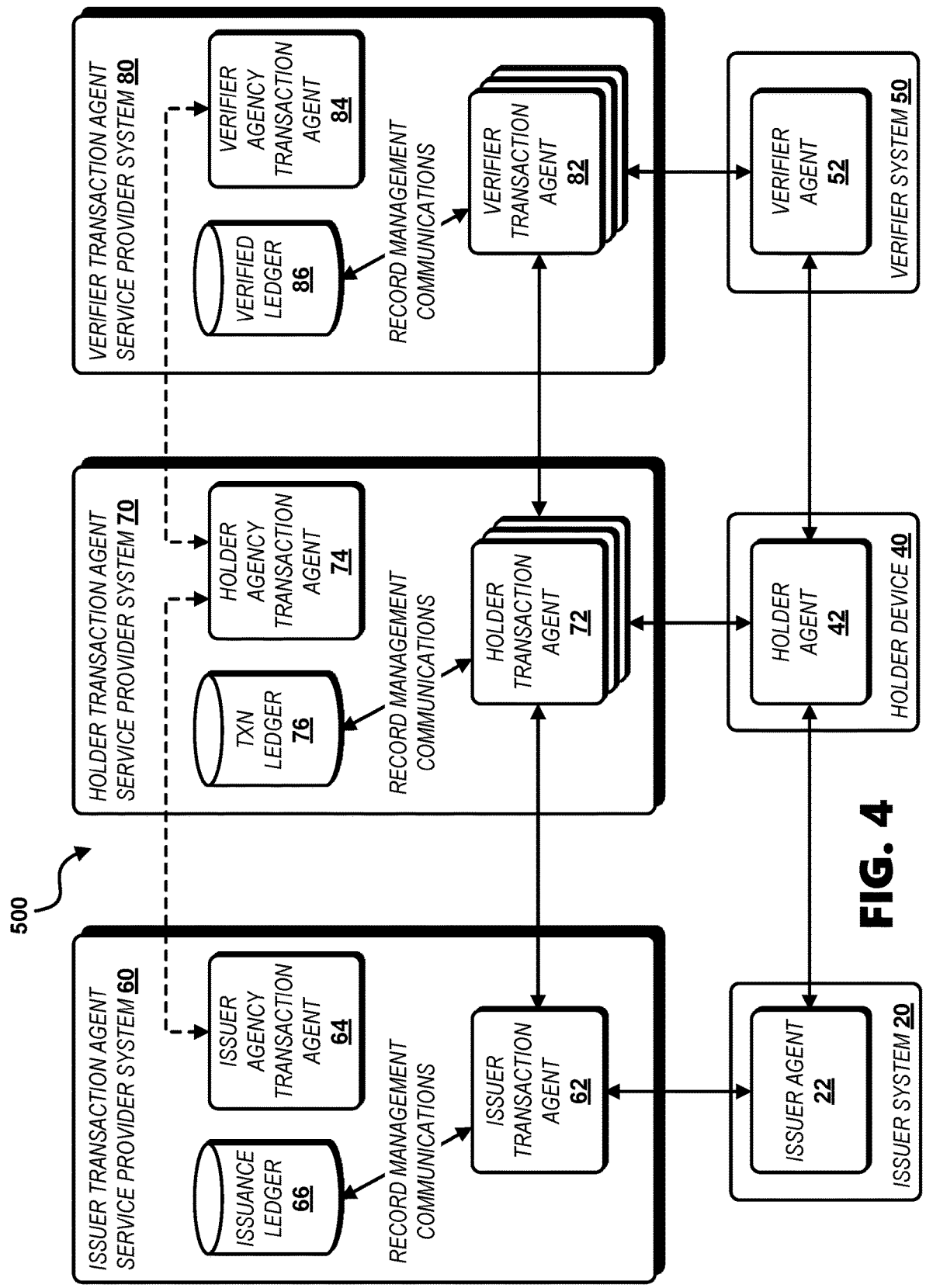
FIG. 4 is a diagram showing a transaction scheme system including systems that respectively enable issuer, holder, and verifier agents and respectively enable issuer, holder, and verifier transaction agents.

Referring to FIG. 4, an exemplary transaction scheme system 500 (e.g., a payment scheme system) in accordance with the SSI system 300 is provided. The transaction scheme system 500 enables cryptographically tracking a proof of a transaction, for example for the purpose of auditing and tracking payments associated with the transaction. The transaction scheme system 500 enables a set of data flows between the issuer agent 22, holder agent 42, verifier agent 52, issuer transaction agent 62, holder transaction agent 72, and verifier transaction agent 82. The transaction scheme system 500 is operable in a computer network including one or more wired or wireless networks or a combination thereof, for example including a local area network (LAN), a wide area network (WAN), the internet, mobile telephone networks, and wireless data networks such as Wi-Fi™ and 3G/4G/5G cellular networks.

An issuer transaction agent service provider system 60 includes the issuer transaction agent 62 and an issuance ledger 66 for recording record management communications from the issuer transaction agent 62 and rendering record management communications accessible to the issuer transaction agent 62. The issuer transaction agent service provider system 60 further includes an issuer agency transaction agent 64 for transmitting and receiving agency-related communications.

A holder transaction agent service provider system 70 includes the holder transaction agent 72 and a transaction ledger 76 for recording record management communications from the holder transaction agent 72 and rendering record management communications accessible to the holder transaction agent 72. The holder transaction agent service provider system 70 further includes a holder agency transaction agent 74 for transmitting and receiving agency-related communications to and from the issuer agency transaction agent 64 and a verifier agency transaction agent 84.

A verifier transaction agent service provider system 80 includes the verifier transaction agent 82 and a verified ledger 86 for recording record management communications from the verifier transaction agent 82 and rendering record management communications accessible to the verifier transaction agent 82. The verifier transaction agent service provider system 80 further includes the verifier agency transaction agent 84 for transmitting and receiving agency-related communications to and from the holder agency transaction agent 74.

A network-connectable processor-enabled issuer system 20 enables the issuer agent 22. A network-connectable processor-enabled holder device 40 enables the holder agent 42. The holder agent 42 can be provided on the holder device 40 for example as a standalone application or a plugin, add-on, or extension to an existing application, for example a web browser plugin. A network-connectable processor-enabled verifier system 50 enables the verifier agent 52. The verifier agent 52 can be provided on the verifier system 50 for example as a standalone application or a plugin, add-on, or extension to an existing application, for example a web browser plugin.

The data flows enabled by the transaction scheme system 500 include those set forth below in Table 1.

TABLE 1

| Data Flow, Purpose | From | To |
| --- | --- | --- |
| Bi-directional, issuance of verifiable credentials | Issuer agent 22 | Holder agent 42 |
| Bi-directional, issuance records management | Issuer agent 22 | Issuer transaction agent 62 |
| Bi-directional, use of verifiable credentials | Holder agent 42 | Verifier agent 52 |
| Bi-directional, transaction records management | Holder agent 42 | Holder transaction agent 72 |
| Bi-directional, verification of verifiable credentials transactions | Verifier agent 52 | Verifier transaction agent 82 |
| Bi-directional, payment of issuer, payment of holder transactions | Verifier transaction agent 82 | Holder transaction agent 72 |
| Bi-directional, payment of verifier, payment of holder transactions | Issuer transaction agent 62 | Holder transaction agent 72 |

Herein a set of co-protocols are defined that will take place, as part of payment schemes within a transaction agent system including the SSI system 300. The described co-protocols track and monetize use of verifiable credentials while using the SSI system 300 in multiple scenarios. The described co-protocols support real-time tracking of transactions where verifiable credentials are used regardless of the cost or payment necessary to support those transactions. Co-protocols can be categorized as either a credential payment category or service payment category.

A credential payment category is where payment occurs during or post-use of a transaction credential. A service payment category is where payment occurs during, or post-use of a service engaged in by a holder from a service provider. It is assumed that the verifier does not get paid to participate in using the SSI infrastructure, except for specific service delivery use cases as described below. For credential payment category use cases, the benefits to the verifier include better quality data, reduced costs of data acquisition, and lower friction to transactions.

In an exemplary first co-protocol corresponding to a credential payment category, a holder agent 42 requests a verifiable credential from an issuer agent 22 and the issuer agent 22 requires payment prior to issuance. In the first co-protocol, the holder of the holder agent 42 is the payer and the issuer agent 22 is the payee. For example, a holder (e.g., consumer) implementing the holder agent 42 wants to use a service on the internet that requires a particular verifiable credential from an issuer implementing the issuer agent 22, and the holder must pay to get the verifiable credential prior to initiating the transaction with the service, wherein the service implements a verifier agent 52.

In an exemplary second co-protocol corresponding to a credential payment category, a holder agent 42 requests a service as part of a transaction that requires a verifiable credential, and an issuer agent 22 requires payment prior to the issuer agent 22 providing an unlock signature allowing a verifier agent 52 implemented by the service to make use of the verifiable credential. In the second co-protocol, the verifier of the verifier agent 52 is the payer, and the issuer agent 22 is the payee. For example, a subscription media streaming service (e.g., Netflix™) implementing the verifier agent 52 pays the issuer agent 22 which provides credential information of a consumer (the holder of the holder agent 42) used as part of a subscription sign up process.

In an exemplary third co-protocol corresponding to a credential payment category, a service is used by a holder of a holder agent 42 in a transaction with a verifier of a verifier agent 52 that requires a verifiable credential, and a system provider of the holder agent 42 requires payment for using the SSI system 300 as part of the transaction. In the third co-protocol, the verifier of the verifier agent 52 is the payer and the system provider of the holder agent 42 is the payee. For example, a credit card company system provides a service to a holder (e.g., a consumer) of the holder agent 42 and the credit card company system receives payment from a verifier (e.g., a product or service vendor) of the verifier agent 52.

In an exemplary fourth co-protocol corresponding to a credential payment category, a service is used by a holder of a holder agent 42 in a transaction with a verifier of a verifier agent 52 that requires a verifiable credential that the holder agent 42 already possesses, and the holder receives payment from the verifier for providing the verifiable credential. In the fourth co-protocol, the verifier of the verifier agent 52 is the payer and the holder of the holder agent 42 is the payee. For example, the holder can be a loyalty program purchaser where the verifier (e.g., loyalty program administrator) pays the holder for providing a verifiable credential as part of a verified purchased transaction under the loyalty program.

In an exemplary fifth co-protocol corresponding to a service payment category, a service provided by a verifier of the verifier agent 52 is used by the holder of the holder agent 42, and the holder wants to pay for the service using the same transaction tracking mechanism that is used for credential tracking but instead is used for service tracking. In the sixth co-protocol, the holder of the holder agent 42 (e.g., buyer) is the payer and the verifier of the verifier agent 52 (e.g., seller) is the payee. For example, a holder of a holder agent 42 (e.g., consumer) has subscribed to a subscription media streaming service (e.g., Netflix™) and wants to pay for the subscription media streaming service using a transaction agent system including the SSI system 300.

In an exemplary sixth co-protocol corresponding to a service payment category, a service provided by a verifier of the verifier agent 52 is used by the holder of the holder agent 42. The service allows different payment mechanisms supported by the verifier, while the holder wants to be to choose which payment method is their preferred method during a specific transaction between the holder and verifier. In the sixth co-protocol, the holder of the holder agent 42 (e.g., buyer) is the payer and the verifier of the verifier agent 52 (e.g., seller) is the payee. For example, a holder of a holder agent 42 (e.g., consumer) has subscribed to a subscription media streaming service (e.g., Netflix™) and wants to pay for the subscription media streaming service using a third-party payment service (e.g., PayPal™) instead of a credit card while using the same transaction agent system (e.g., the SSI system 300) as was used for establishing the subscription.

In an exemplary seventh co-protocol corresponding to a credential payment category, the holder agent 42 requests a verifiable credential from an issuer agent 22 and the issuer agent 22 requires payment prior to issuance. In the seventh co-protocol, a sponsor of the holder of the holder agent 42 is the payer and the issuer agent 22 is the payee.

Various payment schemes are supported by the transaction agents system including the SSI system 300. Described payment schemes rely on the same architectural components included in the SSI system 300 and highlight how the architectural components interact with each other as part of a transaction to support various co-protocols that may be combined to support a payment scheme.

Three exemplary payment schemes are summarized in Table 2.

TABLE 2

| Payment Scheme | Description | Payer | Payee | Frequency |
|---|---|---|---|---|
| $1^{st}$ | Verifier pays issuer per verification for a locked credential | Verifier | Issuer | Per verification |
| $2^{nd}$ | Holder pays issuer per issuance for a verifiable credential | Holder | Issuer | Per issuance |
| $3^{rd}$ | Verifier pays holder per transaction for a verifiable credential | Verifier | Holder | Per verification |

In the exemplary payment schemes of Table 2 there are two scenarios described. The first scenario describes how the payment scheme supports a new verifiable credential being established, and the second scenario describes how subsequent transactions leverage an existing verifiable credential, locked or unlocked. In the case of the third payment scheme, a new verifiable credential payment would occur using the second payment scheme before proceeding with the third payment scheme. Beneficial pre-conditions for the first, second, and third payment schemes include: that the issuer agent 22, holder agent 42, and verifier agent 52 exist and support SSI infrastructure of an SSI system 300, and that transaction infrastructure including transaction agents 62, 72, 82 exists.

Following are four exemplary use cases defined to help highlight the relative pros and cons of each payment scheme of Table 2. A first use case includes providing identity proof for online service sign up. A second use case includes providing a proof of education certificate for an employment application. A third use case includes providing a proof of age to gain access to a social club. A fourth use case includes providing a proof of a certified buyer of a particular product when a user (i.e., buyer) writes a product/service review.

In the first payment scheme in Table 2, the verifier pays the issuer per verification for a locked credential. The first payment scheme implements transaction agents in the verification of credential processes. Payment terms of the first payment scheme include a requirement to pay per verification of transaction. Referring to FIGS. 5A and 5B, two exemplary scenarios where the first payment scheme applies are respectively represented by the process flow and system 600 and the process flow and system 700. In the process flow and system 600 of FIG. 5A, a new verifiable credential is required from an issuer agent 22. Pre-conditions of the process flow and system 600 include a requirement that no prior verifiable credential be held by the holder agent 42. In the process flow and system 700 of FIG. 5B, the holder agent 42 already possesses a verifiable credential previously received from an issuer agent 22.

The process flows and systems 600, 700 enable methods for transacting over a network by a plurality of agents including a first agent, second agent, third agent, fourth agent, fifth agent, and sixth agent. As described with respect to the process flow and system 600 and process flow and system 700, the first agent is depicted as a holder transaction agent 72, the second agent is depicted as a holder agent 42, the third agent is depicted as a verifier agent 52, the fourth agent is depicted as a verifier transaction agent 82, the fifth agent is depicted as an issuer transaction agent 62, and the sixth agent is depicted as an issuer agent 22. The depictions of the plurality of agents with respect to the process flows and systems 600, 700 are exemplary in nature, and the process flows and systems 600, 700 are not limited by the particular naming of each agent.

Referring to FIG. 5A, the process flow and system 600 is shown enabled in a network environment. A holder via the holder agent 42 (i.e., the second agent) wants to initiate a transaction for use of a service from a provider, and the provider acting as a verifier via the verifier agent 52 (i.e., the third agent) wants to verify the holder. The holder agent 42 requests the service from the verifier agent 52 (step 602). The verifier agent 52 specifies to the holder agent 42 which one or more data points such as attributes (e.g., attributes of a verifiable credential) for the transaction are required in a request for data for the transaction (e.g., a presentation request) (step 604), the one or more data points for example defining terms for the transaction (e.g., a contract) analogous to contract terms. Data points can include for example one or more of a holder's first name, last name, date of birth, credit card number, social security number, or passport number. The holder agent 42 requests a verifiable credential from the issuer agent 22 (i.e., the sixth agent) responsive to the request for data from the verifier agent 52 (step 606). The holder agent 42 does not need to disclose the identity of the verifier agent 52 in its request to the issuer agent 22, but the holder agent 42 can present the data points required by the verifier agent 52.

The holder agent 42 and issuer agent 22 interact (step 608) in order to satisfy conditions that need to be met for the issuer agent 22 to be able to issue the requested verifiable credential based on the use case, type of credential, and assurance level. For example, for a know-your-client ("KYC") type verifiable credential, the holder of the holder agent 42 may be required to present their driver license or other identification on camera alongside their face. The issuer agent 22 sends to the holder agent 42 a locked credential (i.e., a verifiable credential that is locked) of the holder and a crypto commitment (step 610), information that will allow a transaction agent to pay a fee for verification. The crypto commitment is related to the locked credential and includes information for the verifier agent 52 to use to contact the issuer agent 22. The crypto commitment can be provided as a partial signature for the locked credential guaranteeing the locked credential is usable by the holder agent 42 and enabling the verifier agent 52 to verify the locked credential after a payment or other requirement is completed via the verifier transaction agent 82. The crypto commitment can include cost and payment information regarding the cost of the locked credential.

The holder agent 42 transmits a response to the verifier agent 52 (e.g., a response to a presentation request) including one or more requirements on the data requested by the verifier agent 52 for fulfilling one or more data points for the transaction (e.g., a contract) to be initiated (step 612). The one or more requirements provided by the holder agent 42 include for example one or more of price, a service level agreement ("SLA"), or policies for the data requested. If the one or more requirements are acceptable to the verifier agent 52, the verifier agent 52 responds by updating the transaction to generate a signed transaction that confirms that the one or more requirements are acceptable, and the verifier agent 52 transmits a response to the holder agent 42 including the signed transaction (step 614). The signed transaction includes data of the issuer agent 22 (e.g., digital identity of the issuer agent 22).

The signed (i.e., "updated") transaction obtained by the holder agent 42 from the verifier agent 52 in step 614, including data of the issuer agent 22 (e.g., digital identity of the issuer agent 22), and the crypto commitment obtained by the holder agent 42 from the issuer agent 22 in step 610 are sent by the holder agent 42 to the holder transaction agent 72 (i.e., the first agent) (step 616). The holder transaction agent 72 beneficially verifies the signature of the signed transaction, for example by applying a public key associated with the verifier agent 52 (step 617). The signed (i.e., "updated") transaction received by the holder transaction agent 72 from the holder agent 42 in the step 616 is written to the transaction ledger 76 by the holder transaction agent 72 (step 618). Confirmation of storing of the signed transaction on the transaction ledger 76 is transmitted by the holder transaction agent 72 to the holder agent 42 (step 620). The holder agent 42 sends the verifier agent 52 a locked verifiable proof, based on the locked credential (e.g., including the locked credential), including the one or more data points ("data point proof") requested by the verifier agent 52 (step 622). The data point proof includes a presentation of the requested one or more data points and one or more locked proofs associated with the requested one or more data points.

The holder agent 42 confirms to the holder transaction agent 72 the fact that the verifier agent 52 was sent the data point proof (step 624), thus unblocking the payment part of the transaction by action of the holder transaction agent 72. The verifier agent 52 sends to the verifier transaction agent 82 (i.e., the fourth agent) the signed transaction and the data point proof received from the holder agent 42 (step 626).

The verifier transaction agent 82 saves the signed transaction and the data point proof to a verified ledger 86 (step 628) to trigger payment initiation. The verifier transaction agent 82 sends payment and proof of the payment for the issuer agent 22 to the holder transaction agent 72 (step 630). The holder transaction agent 72 deidentifies the payment and proof of the payment, and the payment and proof of the payment for the issuer agent 22 ("payment proof"), which does not disclose the payer's identity, is relayed to the issuer transaction agent 62 (i.e., the fifth agent) by the holder transaction agent 72 (step 632). The issuer transaction agent 62 saves the payment proof to the issuance ledger 66 (step 634) so that an unlock signature for the locked credential as associated with the data point proof can be sent back to the verifier agent 52 via the holder transaction agent 72 and verifier transaction agent 82.

The issuer transaction agent 62 sends to the holder transaction agent 72 the unlock signature for the locked credential associated with the data point proof associated with the signed transaction (step 636) for relay to the verifier agent 52. The holder transaction agent 72 relays the unlock signature received from the issuer transaction agent 62 for the locked credential to the verifier transaction agent 82 (step 638). The verifier transaction agent 82 sends to the verifier agent 52 the unlock signature received from the holder transaction agent 72 for the locked credential to unlock the data point proof associated with the signed transaction (step 640). The verifier agent 52 subsequently unlocks the data point proof received from the holder agent 42 for the signed transaction using the unlock signature for the locked credential (step 642).

The verifier agent 52 sends notification to the verifier transaction agent 82 that the transaction has completed successfully (step 644) so that the verifier transaction agent 82 can relay the completed status, and so that the verifier transaction agent 82 can update the verified ledger 86 with the completed status. The verifier transaction agent 82 updates the verified ledger 86 with the completed status (step 646). The verifier transaction agent 82 notifies the holder transaction agent 72 that the transaction has been completed (step 648). The holder transaction agent 72 then updates the transaction ledger 76 with the completed status (step 650).

The holder transaction agent 72 notifies the holder agent 42 that the transaction has been completed (step 652), and the holder agent 42 may choose to show any updates to a user or system. The holder transaction agent 72 notifies the issuer transaction agent 62 that the transaction has been completed (step 654), and the issuer transaction agent 62 updates the issuance ledger 66 with the completed status (step 656).

Steps 618, 620, 624, and 628 provide additional levels of completeness that ensure that the SSI system 300 can detect issues and/or show progress throughout the flow sequence of the process flow and system 600. A system implementation may choose to skip one or more of steps 618, 620, 624, and 628 for optimization purposes without losing the overall resultant exchange of a transaction.

Referring to FIG. 5B, the process flow and system 700 is shown enabled in a network environment. A holder via the holder agent 42 (i.e., the second agent) wants to initiate a transaction for use of a service from a provider, and the provider acting as a verifier via the verifier agent 52 (i.e., the third agent) wants to verify the holder. The holder agent 42 requests the service from the verifier agent 52 (step 702). The verifier agent 52 specifies to the holder agent 42 which one or more data points such as attributes (e.g., attributes of a verifiable credential) for the transaction are required in a request for data for the transaction (e.g., a presentation request) (step 704), the one or more data points for example defining terms for the transaction (e.g., a contract) analogous to contract terms. Data points can include for example one or more of a holder's first name, last name, date of birth, credit card number, social security number, or passport number.

The holder agent 42 transmits a response to the verifier agent 52 (e.g., a response to a presentation request) including one or more requirements on the data requested by the verifier agent 52 for fulfilling the one or more data points for the transaction (e.g., contract) to be initiated (step 706). The one or more requirements provided by the holder agent 42 include for example one or more of price, a service level agreement ("SLA"), or policies for the data requested. If the one or more requirements are acceptable to the verifier agent 52, the verifier agent 52 responds by updating the transaction to generate a signed transaction that confirms that the one or more requirements are acceptable, and the verifier agent 52 transmits a response to the holder agent 42 including the signed transaction (step 708). The signed transaction includes data of the issuer agent 22 (e.g., digital identity of the issuer agent 22).

The signed (i.e., "updated") transaction obtained by the holder agent 42 from the verifier agent 52 in step 708, including data of the issuer agent 22 (e.g., digital identity of the issuer agent 22), and a crypto commitment obtained from the issuer agent 22 at an earlier time is sent by the holder agent 42 to the holder transaction agent 72 (step 710). The holder transaction agent 72 beneficially verifies the signature of the signed transaction, for example by applying a public key associated with the verifier agent 52 (step 711). The signed (i.e., "updated") transaction received by the holder transaction agent 72 from the holder agent 42 in the step 710 is written to the transaction ledger 76 by the holder transaction agent 72 (step 712). Confirmation of storing of the signed transaction on the transaction ledger 76 is transmitted by the holder transaction agent 72 to the holder agent 42 (step 714). The holder agent 42 sends the verifier agent 52 a locked verifiable proof, based on the locked credential (e.g., including the locked credential), including the one or more data points ("data point proof") requested by the verifier agent 52 (step 716). The data point proof includes presentation of the requested one or more data points and locked proofs associated with the requested datapoints.

The holder agent 42 confirms to the holder transaction agent 72 the fact that the verifier agent 52 was sent the data point proof (step 718), thus unblocking the payment part of the transaction by action of the holder transaction agent 72. The verifier agent 52 sends to the verifier transaction agent 82 (i.e., the fourth agent) the signed transaction and the data point proof received from the holder agent 42 (step 720).

The verifier transaction agent 82 saves the signed transaction and the data point proof to a verified ledger 86 (step 722) to trigger payment initiation. The verifier transaction agent 82 sends payment and proof of the payment for the issuer agent 22 to the holder transaction agent 72 (step 724). The holder transaction agent 72 deidentifies the payment and proof of the payment, and the payment and proof of the payment for the issuer agent 22 ("payment proof"), which does not disclose the payer's identity, is relayed to the issuer transaction agent 62 by the holder transaction agent 72 (step 726). The issuer transaction agent 62 saves the payment proof to the issuance ledger 66 (step 728) so that an unlock signature for the locked credential as associated with the data point proof can be sent back to the verifier agent 52 via the holder transaction agent 72 and verifier transaction agent 82.

The issuer transaction agent 62 sends to the holder transaction agent 72 the unlock signature for the locked credential associated with the data point proof associated with the signed transaction (step 730) for relay to the verifier agent 52. The holder transaction agent 72 relays the unlock signature received from the issuer transaction agent 62 for the locked credential to the verifier transaction agent 82 (step 732). The verifier transaction agent 82 sends to the verifier agent 52 the unlock signature received from the holder transaction agent 72 for the locked credential to unlock the data point proof associated with the signed transaction (step 734). The verifier agent 52 subsequently unlocks the data point proof received from the holder agent 42 for the signed transaction using the unlock signature for the locked credential (step 736).

The verifier agent 52 sends notification to the verifier transaction agent 82 that the transaction has completed successfully (step 738) so that the verifier transaction agent 82 can relay the completed status, and so that the verifier transaction agent 82 can update the verified ledger 86 with the completed status. The verifier transaction agent 82 updates the verified ledger 86 with the completed status (step 740). The verifier transaction agent 82 notifies the holder transaction agent 72 that the transaction has been completed (step 742). The holder transaction agent 72 then updates the transaction ledger 76 with the completed status (step 744).

The holder transaction agent 72 notifies the holder agent 42 that the transaction has been completed (step 746), and the holder agent 42 may choose to show any updates to a user or system. The holder transaction agent 72 notifies the issuer transaction agent 62 that the transaction has been completed (step 748), and the issuer transaction agent 62 updates the issuance ledger 66 with the completed status (step 750).

Steps 712, 714, 718, and 722 provide additional levels of completeness that ensure that the SSI system 300 can detect issues and/or show progress throughout the flow sequence of the process flow and system 700. A system implementation may choose to skip one or more of steps 712, 714, 718, and 722 for optimization purposes without losing the overall resultant exchange of a transaction.

The scenarios represented by the process flows and systems 600, 700 enable the second co-protocol and the third co-protocol as described above. In the second co-protocol, the holder agent 42 requests a service as part of a transaction that requires a verifiable credential, and the issuer agent 22 requires payment prior to the issuer agent 22 providing an unlock signature allowing the verifier agent 52 to make use of the verifiable credential. In the second co-protocol, the verifier of the verifier agent 52 is the payer and the issuer agent 22 is the payee. In the third co-protocol, a service is used by a holder of a holder agent 42 in a transaction with a verifier of a verifier agent 52 that requires a verifiable credential, and a system provider of the holder agent 42 requires payment for using the SSI system 300 as part of the transaction. In the third co-protocol, the verifier of the verifier agent 52 is the payer and the system provider of the holder agent 42 is the payee.

The scenarios represented by the process flows and systems 600, 700 are particularly suited for application in support of the herein described first use case which includes providing identity proof for online service sign up. The scenarios represented by the process flows and systems 600, 700 are further suited for application in support of the herein described fourth use case including providing a proof of certified buyer of a particular product when a user (i.e., buyer) writes a product/service review. With regards to the fourth use case, the issuer agent 22 may be motivated not to allow certain incident response platforms ("IRPs") to be able to verify the verifiable credential (e.g., if the IRPs publish bad reviews). Alternatively, other use cases can be supported by the scenarios represented by the process flows and systems 600, 700.

Figure 6A:
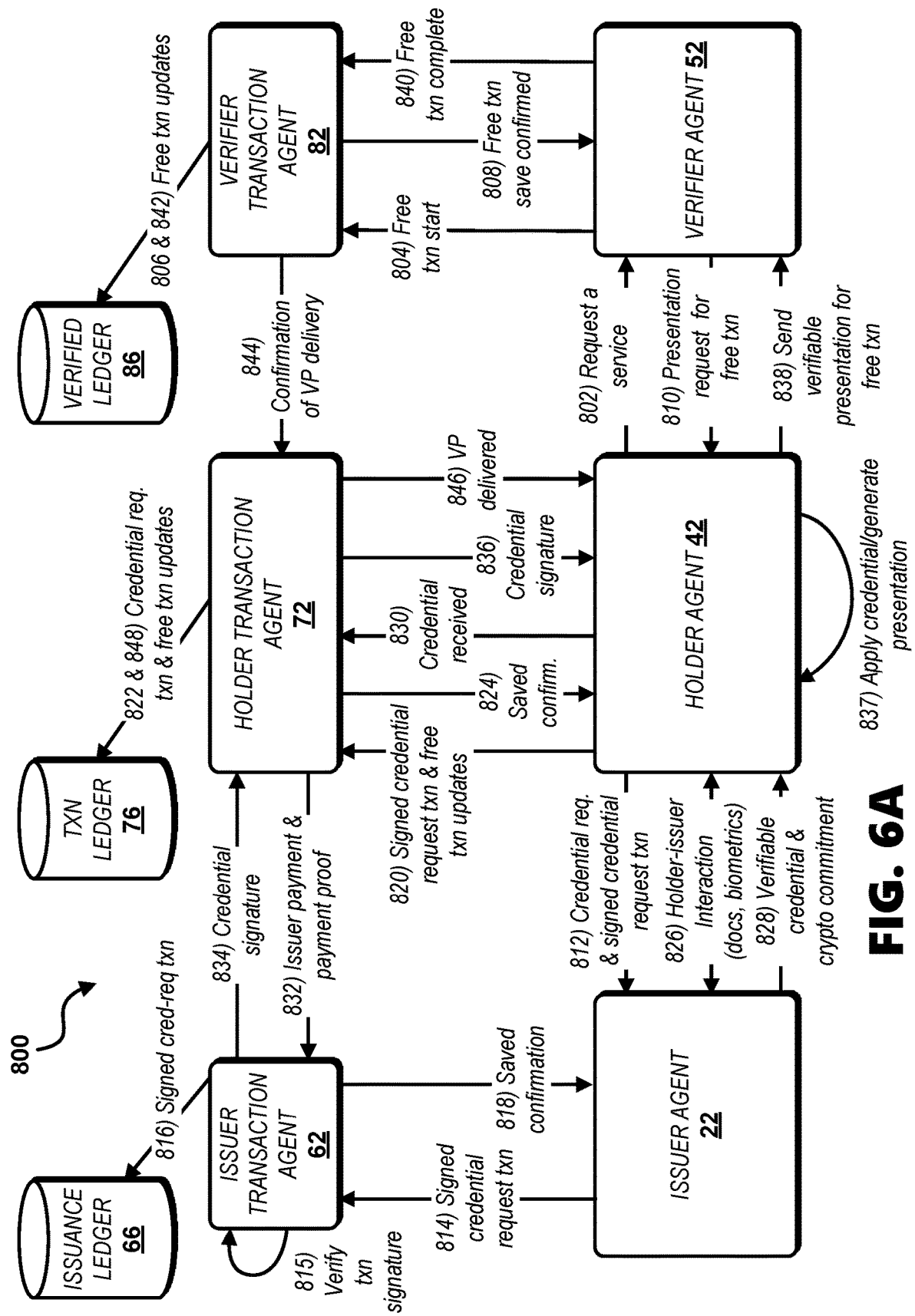
Figure 6B:
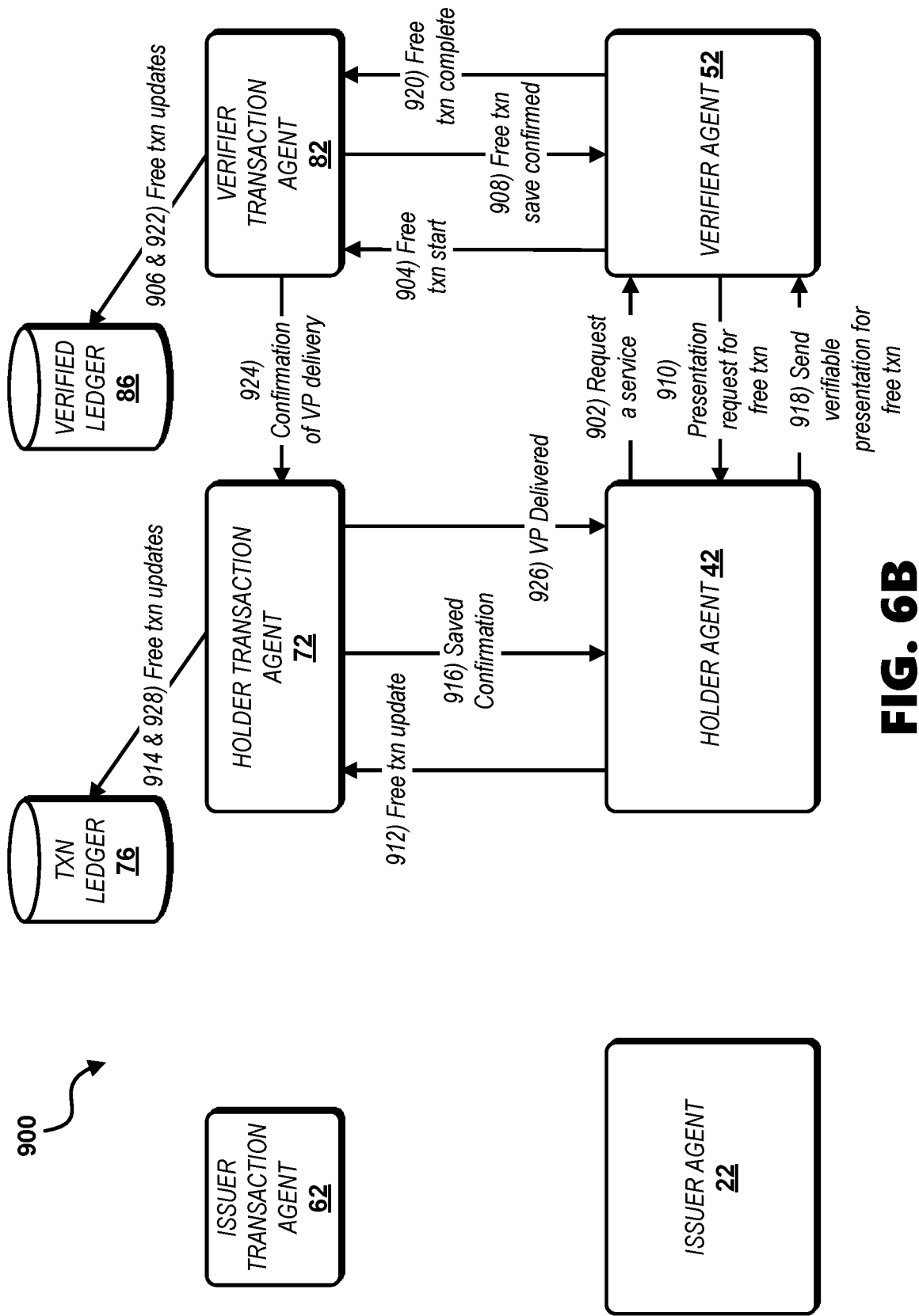

In the second payment scheme in Table 2, a holder pays an issuer per issuance for a verifiable credential. The second payment scheme implements transaction agents in the performance of credential processes. Payment terms of the second payment scheme include a requirement to pay per issuance of verifiable credentials used within a transaction. Referring to FIGS. 6A and 6B, two exemplary scenarios where the second payment scheme applies are respectively represented by the process flow and system 800 and the process flow and system 900. In the process flow and system 800 of FIG. 6A, a new verifiable credential is required from an issuer agent 22. Pre-conditions of the first process flow and system 800 include a requirement that no prior verifiable credential be held by the holder. In the process flow and system 900 of FIG. 6B, the holder agent 42 already possesses a verifiable credential previously received from the issuer agent 22.

The process flows and systems 800, 900 enable methods for transacting over a network by a plurality of agents including a first agent, second agent, third agent, fourth agent, fifth agent, and sixth agent. As described with respect to the process flow and system 800 and process flow and system 900, the first agent is depicted as a holder transaction agent 72, the second agent is depicted as a holder agent 42, the third agent is depicted as a verifier agent 52, the fourth agent is depicted as an issuer transaction agent 62, the fifth agent is depicted as an issuer agent 22, and the sixth agent is depicted as a verifier transaction agent 82. The depictions of the plurality of agents with respect to the process flows and systems 800, 900 are exemplary in nature, and the process flows and systems 800, 900 are not limited by the particular naming of each agent.

Referring to FIG. 6A, the process flow and system 800 is shown enabled in a network environment. A holder via the holder agent 42 (i.e., the second agent) wants to initiate a transaction for use of a service from a provider, and the provider acting as a verifier via the verifier agent 52 (i.e., the third agent) wants to verify the holder. The holder agent 42 requests the service from the verifier agent 52 (step 802). The verifier agent 52 initiates a new transaction not subject to issuer-imposed or holder-imposed cost (hereinafter "free transaction") by sending a start notification to the verifier transaction agent 82 (i.e., the sixth agent) (step 804). The verifier transaction agent 82 saves the notification of the free transaction in the verified ledger 86 in the form of a transaction update (step 806).

The verifier transaction agent 82 notifies the verifier agent 52 that the free transaction has successfully been saved to the verified ledger 86 to allow the verifier agent 52 to begin processing a presentation request (step 808). The verifier agent 52 specifies to the holder agent 42, in a presentation request for the free transaction, one or more data points (e.g., attributes of a verifiable credential) which are required, the presentation request defining terms for the free transaction, the free transaction for example being analogous to a contract (step 810). The holder agent 42 requests a verifiable credential from the issuer agent 22 (i.e., the fifth agent), and the holder agent 42 initiates a signed credential request transaction for including payment for issuance of the verifiable credential (step 812). The issuer agent 22 sends to the issuer transaction agent 62 (i.e., the fourth agent) the signed credential request transaction from the holder agent 42 (step 814). The issuer transaction agent 62 verifies a digital signature of the digitally signed transaction (step 815), for example by application of a public key of the holder agent 42.

The issuer transaction agent 62 saves the signed credential request transaction to the issuance ledger 66 (step 816). The issuer transaction agent 62 sends confirmation of the saving of the signed credential request transaction (step 818) so that the issuer agent 22 can continue with the exchange with the holder agent 42 and to allow the issuance of a verifiable credential to the holder agent 42.

The free transaction obtained from the verifier agent 52 by the holder agent 42 in step 810 and the signed credential request transaction between the holder agent 42 and the issuer agent 22, including data of the issuer agent 22 (e.g., digital identity of the issuer agent 22) are sent by the holder agent 42 to the holder transaction agent 72 (i.e., the first agent) in the form of transaction updates (step 820). The free transaction and the credential request transaction received in step 820 by the holder transaction agent 72 are written to the transaction ledger 76 by the holder transaction agent 72 in the form of transaction updates (step 822). Confirmation of the storing of the free transaction and the credential request transaction on the transaction ledger 76 is sent by the holder transaction agent 72 to the holder agent 42 (step 824).

The holder agent 42 and issuer agent 22 interact (step 826) in order to satisfy conditions that need to be met for the issuer agent 22 to be able to issue the requested verifiable credential based on the use case, type of credential, and assurance level. For example, for a know-your-client ("KYC") type verifiable credential, the holder of the holder agent 42 may be required to present their driver license or other identification on camera alongside their face. The issuer agent 22 sends to the holder agent 42 a verifiable credential of the holder and a crypto commitment (step 828), information that will allow a transaction agent to pay a fee for verification. The crypto commitment is related to the verifiable credential and includes information for the verifier agent 52 to use to contact the issuer agent 22. The crypto commitment can be provided as a partial signature for the verifiable credential guaranteeing the verifiable credential is usable by the holder agent 42 and enabling the verifier agent 52 to verify the verifiable credential after the holder completes payment or other requirement via the holder transaction agent 72. The crypto commitment can include cost and payment information regarding the cost of the verifiable credential.

The holder agent 42 confirms to the holder transaction agent 72 the fact that the issuer agent 22 sent the verifiable credential to the holder agent 42 and the holder agent 42 received the verifiable credential (step 830) thus unblocking the payment part of the credential request transaction by action of the holder transaction agent 72. The holder transaction agent 72 sends to the issuer transaction agent 62 payment for the issuer agent 22 and proof of the payment (step 832). The issuer transaction agent 62 sends to the holder transaction agent 72 a credential signature (originating from the issuer agent 22) for the verifiable credential associated with the credential request transaction (step 834) for the holder transaction agent 72 to relay to the holder agent 42. The holder transaction agent 72 sends to the holder agent 42 the credential signature from the issuer transaction agent 62 to allow the verifiable credential associated with the credential request transaction be used (step 836).

The holder agent 42 sends a verifiable presentation for the free transaction to the verifier agent 52 (step 838), the verifiable presentation including the verifiable credential which includes the one or more data points requested by the verifier agent 52 and one or more proofs corresponding to the requested one or more data points. Responsive to receiving the verifiable presentation including the verifiable credential, the verifier agent 52 sends a verifiable presentation completion status to the verifier transaction agent 82 and notifies the verifier transaction agent 82 that the verifiable presentation has been received from the holder agent 42 and the free transaction has been completed with the holder agent 42 (step 840). The verifier transaction agent 82 saves the verifiable presentation completion status including the free transaction completion information to the verified ledger 86 in the form of a transaction update (step 842). The verifier transaction agent 82 sends notification to the holder transaction agent 72 that the verifiable presentation was delivered to the verifier agent 52 and that the free transaction was completed (step 844).

The holder transaction agent 72 notifies the holder agent 42 that the verifiable presentation was delivered and that the free transaction was completed (step 846). The holder transaction agent 72 updates the transaction ledger 76 with the completion status of the free transaction indicating that the free transaction is complete (step 848).

The scenario represented by the process flow and system 800 enables the first co-protocol and the fourth co-protocol as described above. In the first co-protocol, the holder agent 42 requests a verifiable credential from an issuer agent 22 and the issuer agent 22 requires payment prior to issuance. The process flow and system 800 enables a holder to pay an issuer. Further steps can be configured so the verifier pre-pays or reimburses the holder for money paid or to be paid to the issuer by the holder. In the fourth co-protocol, a service is used by a holder of a holder agent 42 in a transaction with a verifier of a verifier agent 52 that requires a verifiable credential that the holder agent 42 already possesses, and the holder receives payment from the verifier for providing the verifiable credential as part of a transaction.

Referring to FIG. 6B, the process flow and system 900 is shown enabled in a network environment. A holder via the holder agent 42 (i.e., the second agent) wants to initiate a transaction for use of a service from a provider, and the provider acting as a verifier via the verifier agent 52 (i.e., the third agent) wants to verify the holder. The holder agent 42 requests the service from the verifier agent 52 (step 902). The verifier agent 52 initiates a new transaction not subject to issuer-imposed or holder-imposed cost (hereinafter "free transaction") by sending a start notification to the verifier transaction agent 82 (i.e., the sixth agent) (step 904). The verifier transaction agent 82 saves the notification of the free transaction in the verified ledger 86 in the form of a transaction update (step 906).

The verifier transaction agent 82 notifies the verifier agent 52 that the free transaction has successfully been saved to the verified ledger 86 to allow the verifier agent 52 to begin processing a presentation request (step 908). The verifier agent 52 specifies to the holder agent 42, in a presentation request for the free transaction, one or more data points (e.g., attributes of a verifiable credential) which are required, the presentation request defining terms for the free transaction, the free transaction for example being analogous to a contract (step 910).

The free transaction obtained from the verifier agent 52 by the holder agent 42 in step 910 is sent by the holder agent 42 to the holder transaction agent 72 (i.e., the first agent) in the form of a transaction update (step 912). The free transaction received in step 912 by the holder transaction agent 72 is written to the transaction ledger 76 by the holder transaction agent 72 in the form of a transaction update (step 914). Confirmation of the storing of the free transaction on the transaction ledger 76 is sent by the holder transaction agent 72 to the holder agent 42 (step 916).

The holder agent 42 sends a verifiable presentation for the free transaction to the verifier agent 52 (step 918), the verifiable presentation including the verifiable credential which includes the one or more data points requested by the verifier agent 52 and one or more proofs corresponding the requested one or more data points. Responsive to receiving the verifiable presentation including the verifiable credential, the verifier agent 52 sends a verifiable presentation completion status to the verifier transaction agent 82 and notifies the verifier transaction agent 82 that the verifiable presentation has been received from the holder agent 42 and the free transaction has been completed with the holder agent 42 (step 920). The verifier transaction agent 82 saves the verifiable presentation completion status including the free transaction completion information to the verified ledger 86 in the form of a transaction update (step 922). The verifier transaction agent 82 sends notification to the holder transaction agent 72 that the verifiable presentation was delivered to the verifier agent 52 and that the free transaction was completed (step 924).

The holder transaction agent 72 notifies the holder agent 42 that the verifiable presentation was delivered and that the free transaction was completed (step 926). The holder transaction agent 72 updates the transaction ledger 76 with the completion status of the free transaction indicating that the free transaction is complete (step 928).

The scenario represented by the process flow and system 900 is particularly suited for application in support of the herein described first use case which includes providing identity proof for online service sign up. A new credential holder may find it unusual and unacceptable to have to pay for an identity credential during a service signup (if they do not already have one) under the process flow and system 800. However, a holder of an existing verifiable credential that matches the requirements of a verifier can provide that unlocked credential under the process flow and system 900 to enable an online service signup. Further, the scenarios represented by the process flows and systems 800, 900 are particularly suited for application in support of the herein described exemplary second use case (i.e., providing proof of education certificate), third use case (i.e., providing a proof of age to gain access to a social club), and fourth use case (i.e., providing a proof of certified buyer of a particular product when a user writes a product/service review). Alternatively, other use cases can be supported by the scenarios represented by the process flows and systems 800, 900.

In the third payment scheme in Table 2, transaction agents are involved in a transaction where a verifier pays a holder. Payment terms of the third payment scheme include a requirement to pay a holder per transaction for a verifiable credential used within a transaction. Referring to FIG. 7, an exemplary scenario where the third payment scheme applies is represented by the process flow and system 1000 enabled in a network environment. In a case where the third payment scheme applies and where a holder does not yet have the necessary verifiable credential, the process steps applied to acquire a verifiable credential as set forth in the process flow and system 800 are performed followed by the process steps of the process flow and system 1000.

The process flow and system 1000 enables a method for transacting over a network by a plurality of agents including a first agent, second agent, third agent, fourth agent, fifth agent, and sixth agent. As described with respect to the process flow and system 1000, the first agent is depicted as a holder agent 42, the second agent is depicted as a verifier agent 52, the third agent is depicted as a holder transaction agent 72, the fourth agent is depicted as a verifier transaction agent 82, the fifth agent is depicted as an issuer agent 22, and the sixth agent is depicted as an issuer transaction agent 62. The depictions of the plurality of agents with respect to the process flow and system 1000 are exemplary in nature, and the process flow and system 1000 is not limited by the particular naming of each agent.

In the process flow and system 1000, a holder via a holder agent 42 (i.e., the first agent) wants to initiate a transaction for use of a service from a provider, and the provider acting as a verifier via a verifier agent 52 (i.e., the second agent) wants to verify the holder. The holder agent 42 requests the service from the verifier agent 52 (step 1002). The verifier agent 52 initiates a new transaction enabling payment by the verifier to the holder (hereinafter "payment transaction") by sending a start notification to the verifier transaction agent 82 (i.e., the fourth agent) (step 1004). The verifier transaction agent 82 saves the notification of the payment transaction in the verified ledger 86 in the form of a transaction update (step 1006).

The verifier transaction agent 82 notifies the verifier agent 52 that the payment transaction has successfully been saved to the verified ledger 86 to allow the verifier agent 52 to begin processing a presentation request (step 1008). The verifier agent 52 specifies to the holder agent 42, in a presentation request for the payment transaction, one or more data points (e.g., attributes of a verifiable credential) which are required, the presentation request defining terms for the payment transaction, the payment transaction for example being analogous to a contract (step 1010). The holder agent 42 transmits a response to the presentation request for the payment transaction of the verifier agent 52 including one or more requirements on the data requested by the verifier agent 52 for fulfilling one or more data points for the payment transaction (e.g., a contract) to be initiated (step 1012). The one or more requirements provided by the holder agent 42 includes for example one or more of price, a service level agreement ("SLA"), or policies for the data requested. If the one or more requirements are acceptable to the verifier agent 52, the verifier agent 52 responds by updating the payment transaction to generate a signed payment transaction that confirms that the one or more requirements are acceptable, and the verifier agent 52 transmits a response to the holder agent 42 including the signed payment transaction (step 1014).

The signed (i.e., updated) payment transaction obtained by the holder agent 42 from the verifier agent 52 in step 1014 is sent by the holder agent 42 to the holder transaction agent 72 (i.e., the third agent) (step 1016). The holder transaction agent 72 beneficially verifies the signature of the signed payment transaction, for example by applying a public key associated with the verifier agent 52 (step 1017). The signed (i.e., updated) payment transaction received by the holder transaction agent 72 from the holder agent 42 in the step 1016 is written to the transaction ledger 76 by the holder transaction agent 72 (step 1018). Confirmation of the storing of the signed payment transaction on the transaction ledger 76 is transmitted by the holder transaction agent 72 to the holder agent 42 (step 1020).

The verifier transaction agent 82 sends payment confirmation to the holder transaction agent 72 for the signed payment transaction (step 1022). The holder transaction agent 72 sends confirmation to the holder agent 42 that the payment has been received from the verifier via the verifier transaction agent 82 for the payment transaction (step 1024).

The holder agent 42 sends a verifiable presentation for the payment transaction to the verifier agent 52 (step 1026), the verifiable presentation including the verifiable credential which includes the one or more data points requested by the verifier agent 52 and one or more proofs corresponding the requested one or more data points. Responsive to receiving the verifiable presentation including the verifiable credential, the verifier agent 52 sends a verifiable presentation completion status to the verifier transaction agent 82 and notifies the verifier transaction agent 82 that the verifiable presentation has been received from the holder agent 42 and the payment transaction has been completed with the holder agent 42 (step 1028). The verifier transaction agent 82 saves the verifiable presentation completion status including the payment transaction completion information to the verified ledger 86 in the form of a transaction update (step 1030). The verifier transaction agent 82 sends notification to the holder transaction agent 72 that the verifiable presentation ("VP") was delivered to the verifier agent 52 and that the payment transaction was completed (step 1032).

The holder transaction agent 72 notifies the holder agent 42 that the verifiable presentation was delivered, and that the payment transaction was completed (step 1034). The holder transaction agent 72 updates the transaction ledger 76 with the completion status of the payment transaction indicating that the payment transaction is complete (step 1036).

The scenario represented by the process flow and system 1000 enables the fourth co-protocol as described above. In the fourth co-protocol, a service is used by a holder of a holder agent 42 in a transaction with a verifier of a verifier agent 52 that requires a verifiable credential that the holder agent 42 already possesses, and the holder receives payment from the verifier for providing the verifiable credential as part of a transaction. The scenario represented by the process flow and system 1000 is particularly suited for application in support of the herein described fourth use case (i.e., providing a proof of certified buyer of a particular product when a user writes a product/service review). Alternatively, other use cases can be supported by the scenario represented by the process flow and system 1000.

Further to the description above and referring to FIG. 5A, the process flow and system 600 enables a first method for transacting over a network by a plurality of agents including a first agent, second agent, third agent, fourth agent, fifth agent, and sixth agent. The first method is described with reference to the steps and elements of the process flow and system 600 wherein the first agent is depicted as a holder transaction agent 72, the second agent is depicted as a holder agent 42, the third agent is depicted as a verifier agent 52, the fourth agent is depicted as a verifier transaction agent 82, the fifth agent is depicted as an issuer transaction agent 62, and the sixth agent is depicted as an issuer agent 22. The depictions of the plurality of agents with respect to the process flow and system 600 are exemplary in nature, and the process flow and system 600 is not limited by the particular naming of each agent.

The first method for transacting over a network includes receiving by a holder transaction agent 72 (i.e., the first agent) a digitally signed transaction from a holder agent 42 (i.e., the second agent), the digitally signed transaction received by the holder agent 42 from a verifier agent 52 (i.e., the third agent) and including a digital signature (step 616). The holder transaction agent 72 beneficially verifies the digital signature (step 617). A first verifiable proof (e.g., a payment proof, proof of payment) is received by the holder transaction agent 72 from a verifier transaction agent 82 (i.e., the fourth agent) (step 630). The first verifiable proof is transmitted by the holder transaction agent 72 to an issuer transaction agent 62 (i.e., the fifth agent) (step 632). An unlock signature for a locked credential provided by an issuer agent 22 (i.e., the sixth agent) to the holder agent 42 is received by the holder transaction agent 72 from the issuer transaction agent 62 (step 636), and the unlock signature is transmitted by the holder transaction agent 72 to the verifier transaction agent 82 (step 638).

The first method further includes transmitting by the holder agent 42 to the verifier agent 52 a request to initiate a use of a service (step 602), receiving by the holder agent 42 from the verifier agent 52 a request for one or more data points that support verification of an entity to initiate the use of the service (step 604), and transmitting by the holder agent 42 to the verifier agent 52 one or more requirements for fulfilling the one or more data points (step 612). For example, the entity can include one or both of a user of the holder agent 42 or an organization associated with the user of the holder agent 42. The one or more requirements can include for example one or more of a price, a service level agreement ("SLA"), or a policy. A data point can include for example one or more of a first name, last name, date of birth, credit card number, social security number, or passport number. The digitally signed transaction is received by the holder agent 42 from the verifier agent 52 (step 614), and a second verifiable proof (e.g., a data point proof) is transmitted by the holder agent 42 to the verifier agent 52, the second verifiable proof based on the locked credential and including the one or more data points (step 622). For example, the second verifiable proof can include the locked credential including the one or more data points. The first method can further include updating by the holder transaction agent 72 a ledger based on the digitally signed transaction received from the holder agent 42 (step 618).

The first method further includes transmitting by the holder agent 42 a request to the issuer agent 22 for the locked credential (step 606) responsive to the request for the one or more data points from the verifier agent 52, receiving by the holder agent 42 the locked credential from the issuer agent 22 (step 610), and generating by the holder agent 42 the second verifiable proof based on the locked credential (step 622). A request for entity-identifying information can be received by the holder agent 42 from the issuer agent 22, the holder agent 42 can acquire from a user the entity-identifying information, and the entity-identifying information can be transmitted by the holder agent 42 to the issuer agent 22 (step 608). Entity identifying information can include for example a driver license, business license, passport, or social security card.

The first method further includes receiving by the verifier transaction agent 82 from the verifier agent 52 the digitally signed transaction and the second verifiable proof (step 626) and transmitting by the verifier transaction agent 82 to the verifier agent 52 the unlock signature (step 640). A ledger can be updated by the verifier transaction agent 82 based on the digitally signed transaction and the second verifiable proof (step 628). The unlock signature is received by the verifier agent 52 from the verifier transaction agent 82 (step 640), the second verifiable proof is unlocked by the verifier agent 52 using the unlock signature (step 642), and the verifier agent 52 enables the use of the service responsive to the unlocking of the second verifiable proof by the verifier agent 52.

Further to the description above and referring to FIG. 6A, the process flow and system 800 enables a second method for transacting over a network by a plurality of agents including a first agent, second agent, third agent, fourth agent, fifth agent, and sixth agent. The second method is described with reference to the steps and elements of the process flow and system 800 wherein the first agent is depicted as a holder transaction agent 72, the second agent is depicted as a holder agent 42, the third agent is depicted as a verifier agent 52, the fourth agent is depicted as an issuer transaction agent 62, the fifth agent is depicted as an issuer agent 22, and the sixth agent is depicted as a verifier transaction agent 82. The depictions of the plurality of agents with respect to the process flow and system 800 are exemplary in nature, and the process flow and system 800 is not limited by the particular naming of each agent.

The second method for transacting over a network includes receiving by a holder transaction agent 72 (i.e., the first agent) a first transaction (e.g., a free transaction) from a holder agent 42 (i.e., the second agent) (step 820), the first transaction initiated by a verifier agent 52 (i.e., the third agent). A first verifiable proof (e.g., proof of payment) is transmitted by the holder transaction agent 72 to an issuer transaction agent 62 (i.e., the fourth agent) (step 832). The second method further includes receiving by the holder transaction agent 72 from the issuer transaction agent 62 a credential signature for a verifiable credential including one or more data points provided by an issuer agent 22 (i.e., the fifth agent) to the holder agent 42 for the first transaction (step 834) and transmitting by the holder transaction agent 72 to the holder agent 42 the credential signature (step 836).

The second method further includes receiving by the holder transaction agent 72 from the holder agent 42 a second transaction (e.g., a credential request transaction) including identifying data of the issuer agent 22 (step 820) and transmitting by the holder transaction agent 72 to the issuer transaction agent 62 the first verifiable proof based on the second transaction (step 832).

The second method further includes transmitting by the holder agent 42 to the issuer agent 22 a request for the verifiable credential, the request for the verifiable credential including the second transaction (step 812) and providing by the holder agent 42 to the issuer agent 22 entity-identifying information (step 826). The verifiable credential is received by the holder agent 42 from the issuer agent 22 (step 828). An indication that the verifiable credential was received by the holder agent 42 is received by the holder transaction agent 72 from the holder agent 42 (step 830). The transmitting by the holder transaction agent 72 to the issuer transaction agent 62 the first verifiable proof (e.g., the proof of payment) (step 832) is responsive to the receiving by the holder transaction agent 72 from the holder agent 42 the indication that the verifiable credential was received by the holder agent 42.

The second method further includes transmitting by the holder agent 42 to the verifier agent 52 a request to initiate a use of a service (step 802) and receiving by the holder agent 42 from the verifier agent 52 a request for the one or more data points to initiate the use of the service (step 810). The credential signature is applied to the verifiable credential by the holder agent 42 to generate a signed credential including the one or more data points (step 837), and the signed credential including the one or more data points is transmitted by the holder agent 42 to the verifier agent 52 (step 838). A second verifiable proof including the one or more data points can be generated by the holder agent 42 based on the signed credential (step 837). The second verifiable proof including the one or more data points can be transmitted by the holder agent 42 to the verifier agent 52 (step 838). The second verifiable proof can for example be generated and transmitted by the holder agent 42 to the verifier agent 52 as a verifiable presentation ("VP") including the signed credential.

The second method further includes receiving by a verifier transaction agent 82 from the verifier agent 52 an indication that the second verifiable proof has been received by the verifier agent 52 (step 840). The indication that the second verifiable proof has been received by the verifier agent 52 is received by the holder transaction agent 72 from the verifier transaction agent 82 (step 844). The indication that the second verifiable proof has been received by the verifier agent 52 is transmitted by the holder transaction agent 72 to the holder agent 42 (step 846).

The second method further includes updating by the holder transaction agent 72 a ledger based on the second transaction (e.g., a credential request transaction) from the holder agent 42 (step 822) and updating by the holder transaction agent 72 the ledger based on the indication that the second verifiable proof has been received by the verifier agent 52 (step 848).

The second method further includes receiving by the issuer transaction agent 62 from the issuer agent 22 the second transaction (e.g., a credential request transaction) (step 814) and transmitting the credential signature by the issuer transaction agent 62 to the holder transaction agent 72 based on the second transaction and the first verifiable proof (e.g., a proof of payment) (step 834). The second transaction can include a digitally signed transaction, and the issuer transaction agent 62 can verify the digitally signed transaction (step 815).

Further to the description above and referring to FIG. 7, the process flow and system 1000 enables a third method for transacting over a network by a plurality of agents including a first agent, second agent, third agent, and fourth agent. The third method is described with reference to the steps and elements of the process flow and system 1000 wherein the first agent is depicted as a holder agent 42, the second agent is depicted as a verifier agent 52, the third agent is depicted as a holder transaction agent 72, and the fourth agent is depicted as a verifier transaction agent 82. The depictions of the plurality of agents with respect to the process flow and system 1000 are exemplary in nature, and the process flow and system 1000 is not limited by the particular naming of each agent.

The third method for transacting over a network includes transmitting by a holder agent 42 (i.e., the first agent) to a verifier agent 52 (i.e., the second agent) a request to initiate a use of a service (step 1002), receiving by the holder agent 42 from the verifier agent 52 a request for one or more data points to initiate the use of the service (step 1010), transmitting by the holder agent 42 to the verifier agent 52 one or more requirements for fulfilling the one or more data points (step 1012). A digitally signed transaction (e.g., a payment transaction) including a digital signature is received by the holder agent 42 from the verifier agent 52 (step 1014). The digitally signed transaction is transmitted by the holder agent 42 to a holder transaction agent 72 (i.e., the third agent) (step 1016). An indication that a first verifiable proof (e.g., proof of payment, payment proof) for the digitally signed transaction was received is received by the holder agent 42 from the holder transaction agent 72 (step 1024), and the holder agent 42 transmits to the verifier agent 52 a second verifiable proof, the second verifiable proof based on a verifiable credential including the one or more data points (step 1026).

The third method for transacting over a network further includes receiving by the holder transaction agent 72 from a verifier transaction agent 82 (i.e., the fourth agent) the first verifiable proof (e.g., proof of payment, payment proof) (step 1022) and transmitting by the holder transaction agent 72 to the holder agent 42 the indication that the first verifiable proof for the digitally signed transaction was received (step 1024).

The second verifiable proof beneficially includes the verifiable credential. The second verifiable proof can be transmitted as a verifiable presentation ("VP") including the verifiable credential (step 1026). The third method for transacting over a network further includes receiving by a verifier transaction agent 82 from the verifier agent 52 an indication that the second verifiable proof has been received by the verifier agent 52 to complete the digitally signed transaction (step 1028), receiving by the holder transaction agent 72 from the verifier transaction agent 82 the indication that the second verifiable proof has been received by the verifier agent 52 (step 1032), and transmitting by the holder transaction agent 72 to the holder agent 42 the indication that the second verifiable proof has been received by the verifier agent 52 (step 1034).

Further to the description above and referring to FIG. 4, the process flows and systems 600, 700, 800, 900, 1000 are enabled by the transaction scheme system 500 for transacting over a network by a plurality of agents including a first agent, second agent, third agent, fourth agent, fifth agent, and sixth agent. With respect to the transaction scheme system 500, the first agent is depicted as a holder transaction agent 72, the second agent is depicted as a holder agent 42, the third agent is depicted as a verifier agent 52, the fourth agent is depicted as a verifier transaction agent 82, the fifth agent is depicted as an issuer transaction agent 62, and the sixth agent is depicted as an issuer agent 22. A first computing device is depicted as a holder transaction agent service provider system 70 and a second computing device is depicted as a holder device 40. The depictions of the plurality of agents, devices, and ledgers with respect to the transaction scheme system 500 are exemplary in nature, and the transaction scheme system 500 is not limited by the particular naming of each agent, device, or ledger.

The transaction scheme system 500 is configured for transacting over a network and includes a holder transaction agent 72 (i.e., the first agent) and a holder agent 42 (i.e., the second agent). The holder agent 42 is operable to transact with a verifier agent 52 (i.e., the third agent) for use of a service. The verifier agent 52 is enabled to communicate with a verifier transaction agent 82 (i.e., the fourth agent). The holder transaction agent 72 is operable to communicate with the holder agent 42 to facilitate the transacting by the holder agent 42 with the verifier agent 52 for the use of the service, and the holder transaction agent 72 is operable to communicate with the verifier transaction agent 82 to facilitate the transacting by the holder agent 42 with the verifier agent 52 for the use of the service.

The holder transaction agent 72 is further operable to transact with an issuer transaction agent 62 (i.e., the fifth agent) for a signature for a verifiable credential to facilitate the transacting by the holder agent 42 with the verifier agent 52 for the use of the service. The holder agent 42 is further operable to transact with an issuer agent 22 (i.e., the sixth agent) for the verifiable credential to facilitate the transacting by the holder agent 42 with the verifier agent 52 for the use of the service, the issuer agent 22 enabled to communicate with the issuer transaction agent 62. The holder agent 42 is further operable to transmit the verifiable credential to the verifier agent 52.

The holder transaction agent 72 is further operable to transmit the signature for the verifiable credential to the verifier transaction agent 82. The verifier transaction agent 82, included in the transaction scheme system 500, is operable to transmit the signature for the verifiable credential to the verifier agent 52. The transaction scheme system 500 further includes a transaction ledger 76, the holder transaction agent 72 operable to update the transaction ledger 76 based on the transacting by the holder agent 42 for the use of the service. The transaction scheme system 500 further includes a verified ledger 86, the verifier transaction agent 82 operable to update the verified ledger 86 based on the transacting by the holder agent 42 for the use of the service.

The transaction scheme system 500 further includes a holder transaction agent service provider system 70 (i.e., the first computing device) on which the holder transaction agent 72 is enabled and a holder device 40 (i.e., the second computing device) on which the holder agent 42 is enabled.

The transaction scheme system 500 further includes the issuer transaction agent 62 which is operable to transact with the holder transaction agent 72 to provide the holder transaction agent 72 a signature for a verifiable credential to facilitate the transacting by the holder agent 42 with the verifier agent 52 for the use of the service. The verifier transaction agent 82 is operable to receive the signature for the verifiable credential from the holder transaction agent 72 and to transmit the signature for the verifiable credential to the verifier agent 52. The holder agent 42 is further operable to transact with an issuer agent 22 for the verifiable credential to facilitate the transacting by the holder agent 42 with the verifier agent 52 for the use of the service. The holder agent 42 is further operable to transmit the verifiable credential to the verifier agent 52.

The holder agent 42 is further operable to transmit to the issuer agent 22 a request for the verifiable credential. The issuer transaction agent 62 is further operable to receive the request for the verifiable credential from the issuer agent 22, receive a verifiable proof from the holder transaction agent 72, and transmit the signature for the verifiable credential to the holder transaction agent 72 based on the request for the verifiable credential and the verifiable proof.

In further illustrative embodiments, further self-sovereign identity ("SSI") systems are provided for enhancing digital trust for users of network-enabled services (e.g., consumers functioning as holders of credentials) and providers of network-enabled services (e.g., application providers functioning as verifiers of credentials or credential issuers) during transactions over a network.

Figure 8:
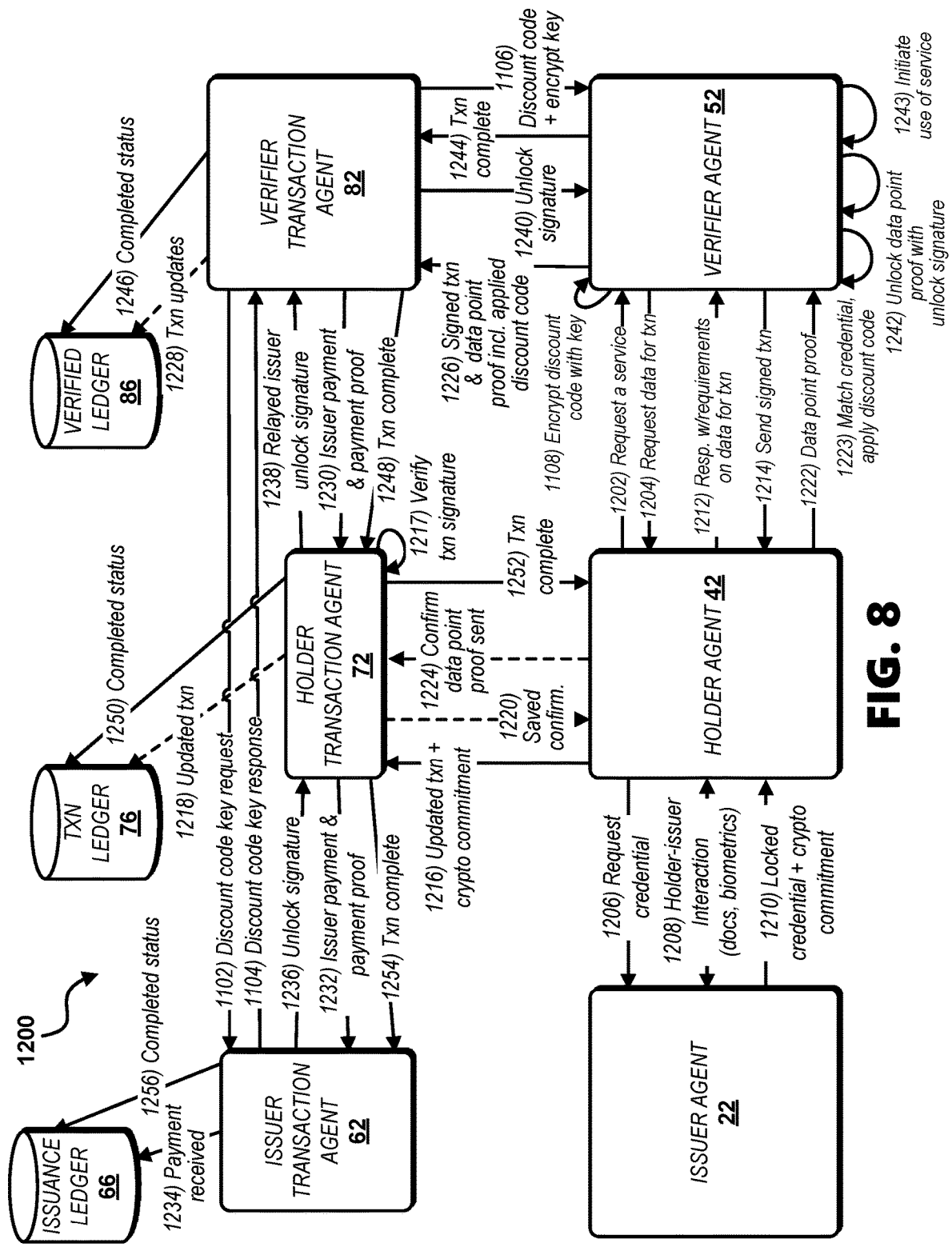
Figure 9:
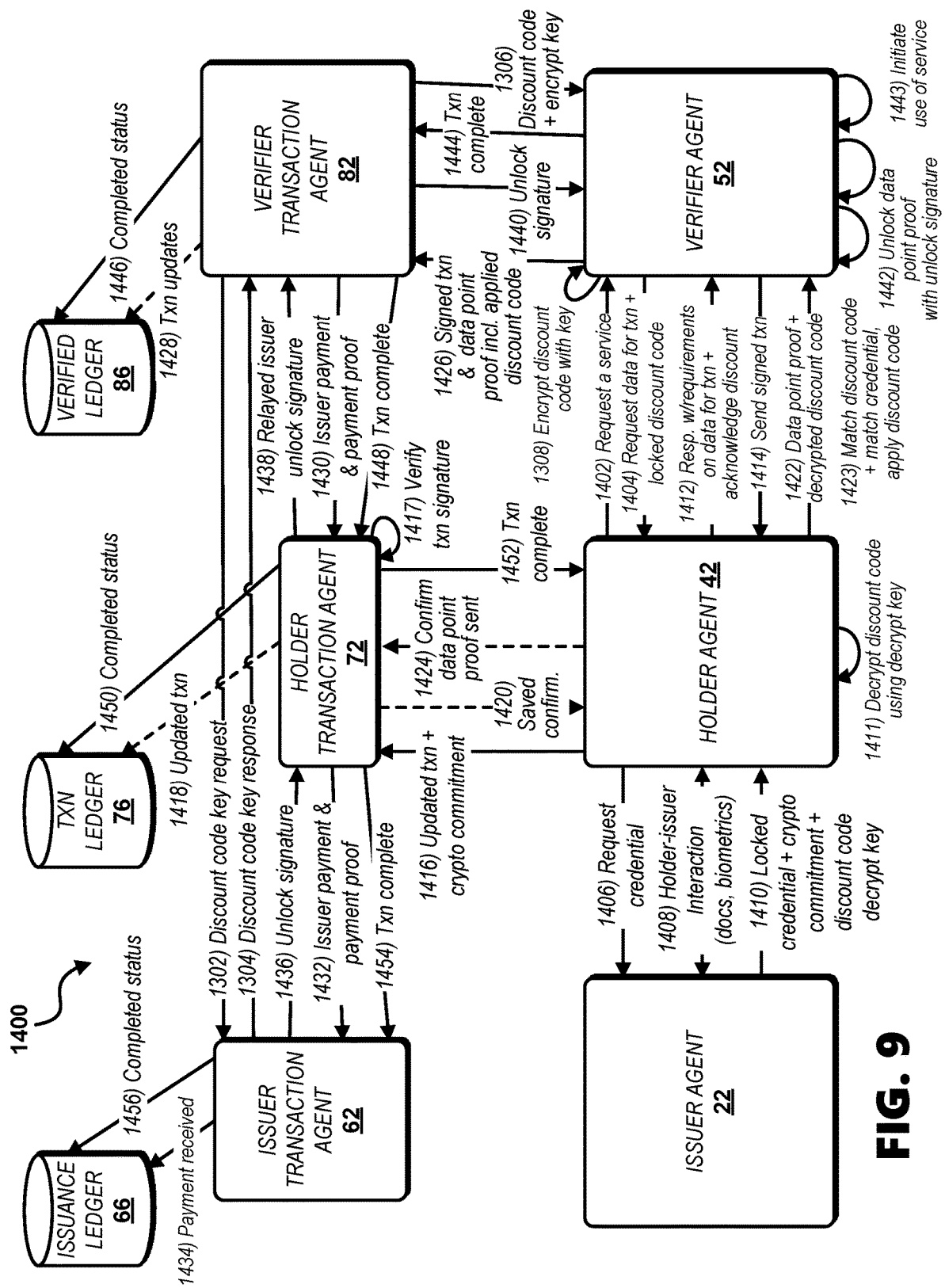
Figure 10:
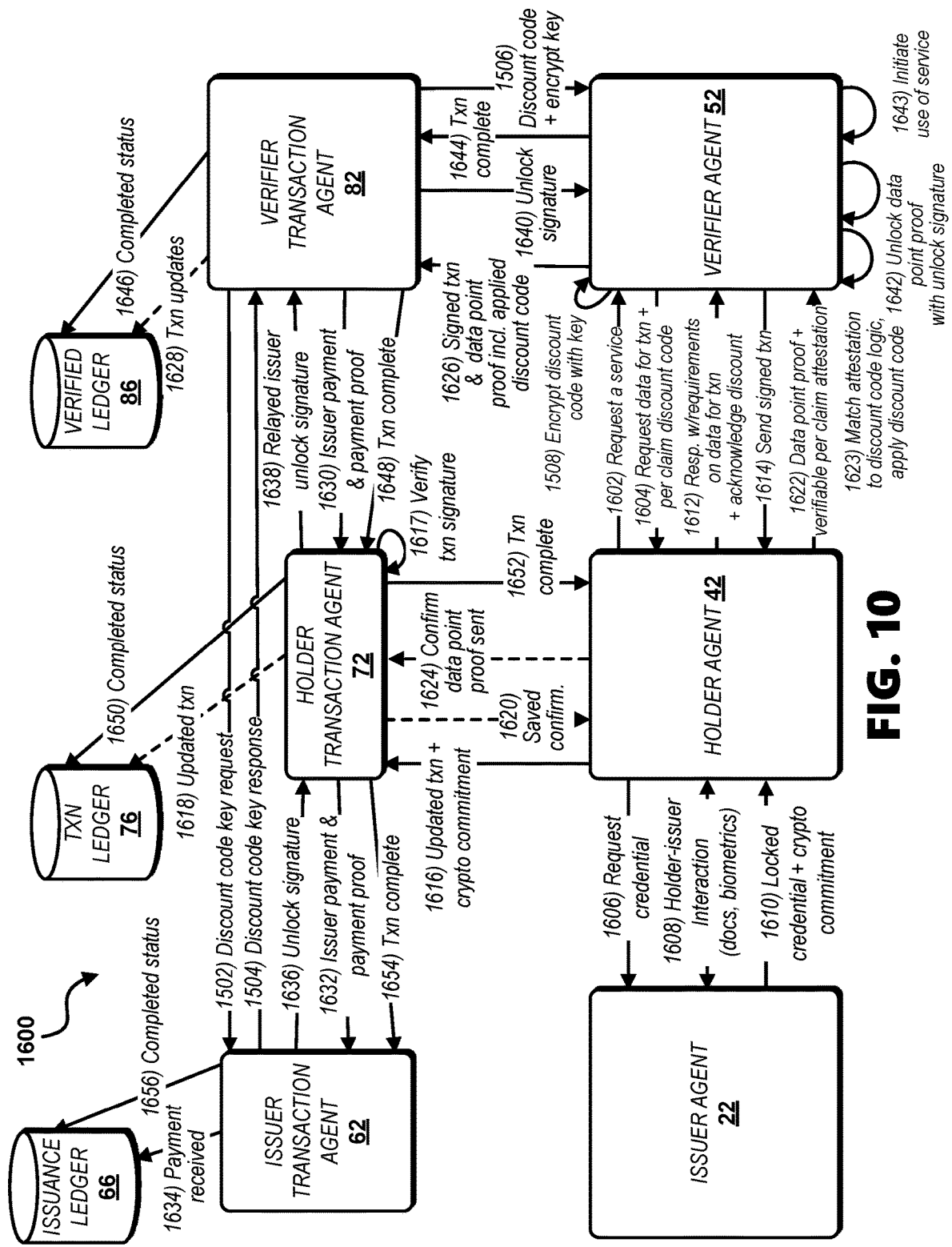

Referring to FIGS. 8, 9, and 10, three additional exemplary scenarios where the first payment scheme applies are respectively represented by the process flow and system 1200, the process flow and system 1400, and the process flow and system 1600. The process flows and systems 1200, 1400, 1600 leverage the messaging defined by the request for data for the transaction (e.g., a presentation request) and the transmission of a verifiable proof including one or more data points ("data point proof") as set forth in the process flows and systems 600, 700.

The process flow and system 1200 models a merchant-side discount code application use case. In the process flow and system 1200, merchant discount code use is applied to post-credential presentation sharing from a holder via the holder agent 42 where the merchant via the verifier agent 52, has previously included in their credential presentation request the necessary credentials required for transaction completion based on the discount code.

The process flow and system 1400 models a cryptographic protected discount code exchange use case. In the process flow and system 1400, a merchant discount code is cryptographically protected and included in a credential presentation request sent from a merchant via the verifier agent 52 to a holder via a holder agent 42, and the holder via the holder agent 42 is able to decrypt relevant discount code associations based on shared credential issuance keys.

The process flow and system 1600 models a shared claim attestation discount code exchange use case. The process flow and system 1600 enables a use case that provides a mechanism for a verifier (e.g., a merchant) to negotiate a discount code with an issuer of a credential type, and for the verifier to share the discount code to others with one or more requirements for applying one or more discounts or other benefits. In the process flow and system 1600, merchant discount codes are included in a credential presentation request sent from a merchant via the verifier agent 52 to the holder via the holder agent 42, wherein the discount code included in the request identifies a credential claim attestation required to receive the discount when the credentials are provided by the holder via the holder agent 42 to the merchant via the verifier agent 52 in a credential presentation response. A credential claim attestation is an assertion of credential claims including values existing in one or more credentials. For example, the discount code or other transaction code provides for a discount or benefit proportional to the number of credential claims in one or more credentials meeting a particular criterion or criteria as indicated in a credential claim attestation received from the holder agent 42.

The process flows and systems 1200, 1400, 1600 enable methods for transacting over a network by a plurality of agents including a first agent, second agent, third agent, fourth agent, fifth agent, and sixth agent. As described with respect to the process flows and systems 1200, 1400, 1600 the first agent is depicted as a verifier transaction agent 82, the second agent is depicted as a verifier agent 52, the third agent is depicted as an issuer transaction agent 62, the fourth agent is depicted as a holder transaction agent 72, the fifth agent is depicted as a holder agent 42, and the sixth agent is depicted as an issuer agent 22. The depictions of the plurality of agents with respect to the process flows and systems 1200, 1400, 1600 are exemplary in nature, and the process flows and systems 1200, 1400, 1600 are not limited by the particular naming of each agent.

The process flow and system 1200 enables a use case that provides a mechanism for a verifier (e.g., a merchant) to negotiate a discount code with an issuer of a credential type and then to apply the discount to holders that present that credential type, or alternatively present a credential claim type of that credential type, as part of a verifiable proof response. While described with reference to a transaction code including a discount code, the process and flow system 1200 can be applied to other transaction codes associated with other benefits, for example a transaction code providing reward points. Referring to FIG. 8, the process flow and system 1200 is shown enabled in a network environment. A holder via the holder agent 42 (i.e., the fifth agent) wants to initiate a transaction for use of a service from a provider, and the provider acting as a verifier via the verifier agent 52 (i.e., the second agent) wants to verify the holder. As described herein, the provider may include a merchant or other entity enabled to deliver a network-enabled service, which service may include initiation of a delivery of a digital or physical product or an online service.

A verifier via the verifier transaction agent 82 (i.e., the first agent) requests a discount code and an encryption key directly from an issuer via an issuer transaction agent 62 (i.e., the third agent) without any context of holders that may use the verifier's services (step 1102). The verifier transaction agent 82 receives a response from the issuer transaction agent 62 to the discount code request which includes a discount code and a discount code encrypt key, for example a symmetric key or an asymmetric key (step 1104). The verifier transaction agent 82 forwards the discount code and the discount code encrypt key to the verifier agent 52 (step 1106). The verifier agent 52 applies the encrypt key to the discount code to generate a locked discount code (step 1108). Alternatively, the discount code is provided by the issuer transaction agent 62 as a locked discount code already encrypted by the encrypt key. Steps 1102, 1104, 1106, and 1108 are performed once, or periodically, or upon receipt by the verifier agent 52 of a new locked issuer credential discount code. The remaining steps 1202-1256 in the process flow and system 1200 are performed for each transaction in which a user requests a service via the holder agent 42.

The holder agent 42 requests the service from the verifier agent 52 (step 1202). The verifier agent 52 specifies to the holder agent 42 which one or more data points such as attributes (e.g., attributes of a verifiable credential) for the transaction are required in a request for data for the transaction (e.g., a presentation request) (step 1204), the one or more data points for example defining terms for the transaction (e.g., a contract) analogous to contract terms. Data points can include for example one or more of a holder's first name, last name, date of birth, credit card number, social security number, or passport number. In the request for the data for the transaction of step 1204, the verifier agent 52 can include in a non-protected unencrypted manner the discount code for the credential type that the verified transaction agent 82 has negotiated via the issuer transaction agent 62 with the issuer of the credential type, or the discount code for the credential claims that may apply to the credential type. In the request for the data for the transaction, the verifier agent 52 can include one or more discount codes from one or more issuers corresponding to one or more credential types or one or more credential claim types. One or more credential claims may fulfill the one or more data points specified in the step 1204, for example a credential claim can include one or more of a holder's first name, last name, date of birth, credit card number, social security number, or passport number. The holder agent 42 requests a verifiable credential from the issuer agent 22 (i.e., the sixth agent) responsive to the request for data from the verifier agent 52 (step 1206). The holder agent 42 does not need to disclose the identity of the verifier agent 52 in its request to the issuer agent 22, but the holder agent 42 can present the data points required by the verifier agent 52.

The holder agent 42 and issuer agent 22 interact (step 1208) in order to satisfy conditions that need to be met for the issuer agent 22 to be able to issue the requested verifiable credential based on the use case, type of credential, and assurance level. For example, for a know-your-client ("KYC") type verifiable credential, the holder of the holder agent 42 may be required to present their driver license or other identification on camera alongside their face. The issuer agent 22 sends to the holder agent 42 a locked credential (i.e., a verifiable credential that is locked) of the holder and a crypto commitment (step 1210), information that will allow a transaction agent to pay a fee for verification. The crypto commitment is related to the locked credential and includes information for the verifier agent 52 to use to contact the issuer agent 22. The crypto commitment can be provided as a partial signature for the locked credential guaranteeing the locked credential is usable by the holder agent 42 and enabling the verifier agent 52 to verify the locked credential after a payment or other requirement is completed via the verifier transaction agent 82. The crypto commitment can include cost and payment information regarding the cost of the locked credential.

The holder agent 42 transmits a response to the verifier agent 52 (e.g., a response to a presentation request) including one or more requirements on the data requested by the verifier agent 52 for fulfilling one or more data points for the transaction (e.g., a contract) to be initiated (step 1212). The one or more requirements provided by the holder agent 42 include for example one or more of price, a service level agreement ("SLA"), or policies for the data requested. If the one or more requirements are acceptable to the verifier agent 52, the verifier agent 52 responds by updating the transaction to generate a signed transaction that confirms that the one or more requirements are acceptable, and the verifier agent 52 transmits a response to the holder agent 42 including the signed transaction (step 1214). The signed transaction includes data of the issuer agent 22 (e.g., digital identity of the issuer agent 22).

The signed (i.e., "updated") transaction obtained by the holder agent 42 from the verifier agent 52 in step 1214, including data of the issuer agent 22 (e.g., digital identity of the issuer agent 22), and the crypto commitment obtained by the holder agent 42 from the issuer agent 22 in step 1210 are sent by the holder agent 42 to the holder transaction agent 72 (i.e., the fourth agent) (step 1216). The holder transaction agent 72 beneficially verifies the signature of the signed transaction, for example by applying a public key associated with the verifier agent 52 (step 1217). The signed (i.e., "updated") transaction received by the holder transaction agent 72 from the holder agent 42 in the step 1216 is written to the transaction ledger 76 by the holder transaction agent 72 (step 1218). Confirmation of storing of the signed transaction on the transaction ledger 76 is transmitted by the holder transaction agent 72 to the holder agent 42 (step 1220). The holder agent 42 sends the verifier agent 52 a locked verifiable proof, based on the locked credential (e.g., including the locked credential), for example based on one or more credential claims of the locked credential, including the one or more data points ("data point proof") requested by the verifier agent 52 (step 1222). The data point proof includes a presentation of the requested one or more data points and one or more locked proofs associated with the requested one or more data points.

The verifier agent 52 determines if the presentation includes one or more credentials of type matching one or more credential types required to apply the discount or includes one or more credential claims of type matching one or more credential claim types required to apply the discount, and the verifier agent 52 applies the discount to the transaction using the discount code if the one or more credentials match the one or more required credential types or if the one or more credential claims match the one or more required credential claim types (step 1223). By the step 1223, the verifier agent 52 ensures that the holder agent 42 has provided a credential or a claim of a credential from the issuer that had agreed with the verifier via the verifier transaction agent 82 to provide the discount code for the credential type or the credential claim type and had provided via an issuer transaction agent 62 the discount code encrypt key to the verifier transaction agent 82 in step 1104. As indicated herein, the method 1200 is operable with other types of transaction codes as alternatives to discount codes. For example, more generally in step 1223, the verifier agent 52 determines if the presentation includes one or more credentials of type matching one or more credential types required to apply a benefit (e.g., reward points, a discount) associated with the transaction code or if the presentation includes one or more credential claims of type matching one or more credential claim types required to apply a benefit (e.g., reward points, a discount), and the verifier agent 52 applies the benefit to the transaction using the transaction code if the one or more credentials match the one or more required credential types or if the one or more credential claims of the one or more credentials match the one or more credential claim types (step 1223).

The holder agent 42 confirms to the holder transaction agent 72 the fact that the verifier agent 52 was sent the data point proof (step 1224), thus unblocking the payment part of the transaction by action of the holder transaction agent 72. The verifier agent 52 sends to the verifier transaction agent 82 (i.e., the first agent) the signed transaction, the data point proof received from the holder agent 42, and the applied discount code (step 1226).

The verifier transaction agent 82 saves the signed transaction and the data point proof to a verified ledger 86 (step 1228) to trigger payment initiation. The verifier transaction agent 82 sends payment and proof of the payment for the issuer agent 22 and the applied discount code to the holder transaction agent 72 (step 1230). The holder transaction agent 72 deidentifies the payment and proof of the payment, and the payment and proof of the payment for the issuer agent 22 ("payment proof") and the applied discount code, which do not disclose the payer's identity, are relayed to the issuer transaction agent 62 (i.e., the third agent) by the holder transaction agent 72 (step 1232). The issuer transaction agent 62 saves the payment proof to the issuance ledger 66 (step 1234) so that an unlock signature for the locked credential as associated with the data point proof can be sent back to the verifier agent 52 via the holder transaction agent 72 and verifier transaction agent 82.

The issuer transaction agent 62 sends to the holder transaction agent 72 the unlock signature for the locked credential associated with the data point proof associated with the signed transaction (step 1236) for relay to the verifier agent 52. The holder transaction agent 72 relays the unlock signature received from the issuer transaction agent 62 for the locked credential to the verifier transaction agent 82 (step 1238). The verifier transaction agent 82 sends to the verifier agent 52 the unlock signature received from the holder transaction agent 72 for the locked credential to unlock the data point proof associated with the signed transaction (step 1240). The verifier agent 52 subsequently unlocks the data point proof received from the holder agent 42 for the signed transaction using the unlock signature for the locked credential (step 1242).

The verifier agent 52 compares one or more data points included in the unlocked data point proof to particular values to verify, validate, or verify and validate the one or more data points, and the verifier agent 52 initiates the use of the service responsive to the verifying, validating, or verifying and validating the one or more data points (step 1243). For example, in the step 1243 the verifier agent 52 can verify or validate data points including one or more of a first name, last name, date of birth, credit card number, social security number, or passport number of a holder based on one or more criteria. The initiating of the service can include initiating (e.g., unlocking) a network-accessible service. The initiating a network-accessible service for example includes providing a benefit to a holder (e.g., a discount to a holder) or delivery of a digital or physical product or an online service.

The verifier agent 52 sends notification to the verifier transaction agent 82 that the transaction has completed successfully (step 1244) so that the verifier transaction agent 82 can relay the completed status, and so that the verifier transaction agent 82 can update the verified ledger 86 with the completed status. The verifier transaction agent 82 updates the verified ledger 86 with the completed status (step 1246). The verifier transaction agent 82 notifies the holder transaction agent 72 that the transaction has been completed (step 1248). The holder transaction agent 72 then updates the transaction ledger 76 with the completed status (step 1250).

The holder transaction agent 72 notifies the holder agent 42 that the transaction has been completed (step 1252), and the holder agent 42 may choose to show any updates to a user or system. The holder transaction agent 72 notifies the issuer transaction agent 62 that the transaction has been completed (step 1254), and the issuer transaction agent 62 updates the issuance ledger 66 with the completed status (step 1256).

Steps 1218, 1220, 1224, and 1228 provide additional levels of completeness that ensure that the SSI system 300 can detect issues and/or show progress throughout the flow sequence of the process flow and system 1200. A system implementation may choose to skip one or more of steps 1218, 1220, 1224, and 1228 for optimization purposes without losing the overall resultant exchange of a transaction.

The process flow and system 1400 enables a use case that provides a mechanism for a verifier (e.g., a merchant) to negotiate a discount code with an issuer of a credential type and then hide that discount code from anyone that has not purchased or received a credential from the issuer. While described with reference to a transaction code including a discount code, the process and flow system 1400 can be applied to other transaction codes associated with other benefits, for example a transaction code providing reward points. Referring to FIG. 9, the process flow and system 1400 is shown enabled in a network environment. A holder via the holder agent 42 (i.e., the fifth agent) wants to initiate a transaction for use of a service from a provider, and the provider acting as a verifier via the verifier agent 52 (i.e., the second agent) wants to verify the holder. As described herein, the provider may include a merchant or other entity enabled to deliver a network-enabled service which service may include initiation of delivery of digital or physical product or online service.

A verifier via the verifier transaction agent 82 (i.e., the first agent) requests a discount code for one or more credentials that are recognized by the verifier agent 52 and an encryption key directly from an issuer via an issuer transaction agent 62 (i.e., the third agent) without any context of holders that may use the verifier's services (step 1302). The purpose of the encryption key is for encryption of the discount code such that only holders that have received credentials from the issuer who provides the encryption key will be able to view and use the discount code. The verifier transaction agent 82 receives a response from the issuer transaction agent 62 to the discount code request which includes a discount code encrypt key, for example a symmetric key or an asymmetric key (step 1304). The verifier transaction agent 82 forwards the discount code encrypt key to the verifier agent 52 (step 1306). The verifier agent 52 applies the encrypt key to the discount code to generate a locked (encrypted) discount code (step 1308). Alternatively, the discount code is provided by the issuer transaction agent 62 as a locked discount code already encrypted by the encrypt key. Steps 1302, 1304, 1306, and 1308 are performed once, or periodically, or upon receipt by the verifier agent 52 of a new locked issuer credential discount code. The remaining steps 1402-1456 in the process flow and system 1400 are performed for each transaction in which a user requests a service via the holder agent 42.

The holder agent 42 requests the service from the verifier agent 52 (step 1402). The verifier agent 52 specifies to the holder agent 42 (e.g., in a presentation request) which one or more data points such as attributes (e.g., attributes of a verifiable credential) for the transaction are required in a request for data for the transaction (e.g., a presentation request) and provides to the holder agent the locked (encrypted) discount code for one or more credentials that are recognized by the verifier agent 52 (step 1404), the one or more data points for example defining terms for the transaction (e.g., a contract) analogous to contract terms. Data points can include for example one or more of a holder's first name, last name, date of birth, credit card number, social security number, or passport number. The holder agent 42 requests a verifiable credential from the issuer agent 22 (i.e., the sixth agent) responsive to the request for data from the verifier agent 52 (step 1406). The holder agent 42 does not need to disclose the identity of the verifier agent 52 in its request to the issuer agent 22, but the holder agent 42 can present the data points required by the verifier agent 52.

The holder agent 42 and issuer agent 22 interact (step 1408) in order to satisfy conditions that need to be met for the issuer agent 22 to be able to issue the requested verifiable credential based on the use case, type of credential, and assurance level. For example, for a know-your-customer ("KYC") type verifiable credential, the holder of the holder agent 42 may be required to present their driver license or other identification on camera alongside their face. The issuer agent 22 sends to the holder agent 42 a locked credential (i.e., a verifiable credential that is locked) of the holder, a crypto commitment, and the discount code decrypt key (step 1410), information that will allow a transaction agent to pay a fee for verification. In the case of symmetric encryption, the discount code decrypt key is identical to the discount code encrypt key provided by the issuer transaction agent 62. In the case of asymmetric encryption, the discount code decrypt key provided by the issuer agent 22 and the discount code encrypt key provided by the issuer transaction agent 62 are different. The crypto commitment is related to the locked credential and includes information for the verifier agent 52 to use to contact the issuer agent 22. The crypto commitment can be provided as a partial signature for the locked credential guaranteeing the locked credential is usable by the holder agent 42 and enabling the verifier agent 52 to verify the locked credential after a payment or other requirement is completed via the verifier transaction agent 82. The crypto commitment can include cost and payment information regarding the cost of the locked credential.

The holder agent 42 decrypts the locked discount code (step 1411). The holder agent 42 transmits a response to the verifier agent 52 (e.g., a response to a presentation request) including one or more requirements on the data requested by the verifier agent 52 for fulfilling one or more data points for the transaction (e.g., a contract) to be initiated and including an acknowledgement of a discount associated with the discount code (step 1412). The one or more requirements provided by the holder agent 42 include for example one or more of price, a service level agreement ("SLA"), or policies for the data requested. If the one or more requirements are acceptable to the verifier agent 52, the verifier agent 52 responds by updating the transaction to generate a signed transaction that confirms that the one or more requirements are acceptable, and the verifier agent 52 transmits a response to the holder agent 42 including the signed transaction (step 1414). The signed transaction includes data of the issuer agent 22 (e.g., digital identity of the issuer agent 22).

The signed (i.e., "updated") transaction obtained by the holder agent 42 from the verifier agent 52 in step 1414, including data of the issuer agent 22 (e.g., digital identity of the issuer agent 22), and the crypto commitment obtained by the holder agent 42 from the issuer agent 22 in step 1410 are sent by the holder agent 42 to the holder transaction agent 72 (i.e., the fourth agent) (step 1416). The holder transaction agent 72 beneficially verifies the signature of the signed transaction, for example by applying a public key associated with the verifier agent 52 (step 1417). The signed (i.e., "updated") transaction received by the holder transaction agent 72 from the holder agent 42 in the step 1416 is written to the transaction ledger 76 by the holder transaction agent 72 (step 1418). Confirmation of storing of the signed transaction on the transaction ledger 76 is transmitted by the holder transaction agent 72 to the holder agent 42 (step 1420). The holder agent 42 sends the verifier agent 52 a locked verifiable proof, based on the locked credential (e.g., including the locked credential), including the one or more data points ("data point proof") requested by the verifier agent 52 and the decrypted (unlocked) discount code (step 1422). The data point proof includes a presentation of the requested one or more data points and one or more locked proofs associated with the requested one or more data points.

The verifier agent 52 determines if the decrypted discount code from the holder agent 42 matches the discount code from the verifier transaction agent 82 and determines if the presentation includes one or more credentials of type matching one or more credential types required to apply the discount or includes one or more credential claims of type matching one or more credential claim types required to apply the discount, and the verifier agent 52 applies the discount to the transaction using the discount code if the decrypted discount code from the holder agent 42 matches the discount code from the verifier transaction agent 82 and if the one or more credentials match the one or more required credential types or if the one or more credential claims match the one or more required credential claim types (step 1423). By implementing step 1423, the verifier agent 52 ensures that the holder agent 42 has provided a credential or a claim of a credential from the issuer that had provided via an issuer transaction agent 62 the discount code encrypt key to the to the verifier transaction agent 82 in step 1304. As indicated herein, the method 1400 is operable with other types of transaction codes as alternatives to discount codes. For example, more generally in step 1423, the verifier agent 52 determines if a decrypted transaction code from the holder agent 42 matches a transaction code from the verifier transaction agent 82 and determines if the presentation includes one or more credentials of type matching one or more credential types required to apply a benefit (e.g., reward points, a discount) or if the presentation includes one or more credential claims of type matching one or more credential claim types required to apply a benefit (e.g., reward points, a discount), and the verifier agent 52 applies the benefit to the transaction using the transaction code if the decrypted transaction code from the holder agent 42 matches the transaction code from the verifier transaction agent 82 and if the one or more credentials match the one or more required credential types, or if the decrypted transaction code from the holder agent 42 matches the transaction code from the verifier transaction agent 82 and if the one or more credential claims of the one or more credentials match the required one or more credential claim types (step 1423).

The holder agent 42 confirms to the holder transaction agent 72 the fact that the verifier agent 52 was sent the data point proof (step 1424), thus unblocking the payment part of the transaction by action of the holder transaction agent 72. The verifier agent 52 sends to the verifier transaction agent 82 (i.e., the first agent) the signed transaction, the data point proof received from the holder agent 42, and the applied discount code (step 1426).

The verifier transaction agent 82 saves the signed transaction and the data point proof to a verified ledger 86 (step 1428) to trigger payment initiation. The verifier transaction agent 82 sends payment and proof of the payment for the issuer agent 22 and the applied discount code to the holder transaction agent 72 (step 1430). The holder transaction agent 72 deidentifies the payment and proof of the payment, and the payment and proof of the payment for the issuer agent 22 ("payment proof") and the applied discount code, which do not disclose the payer's identity, are relayed by the issuer transaction agent 62 (i.e., the third agent) by the holder transaction agent 72 (step 1432). The issuer transaction agent 62 saves the payment proof to the issuance ledger 66 (step 1434) so that an unlock signature for the locked credential as associated with the data point proof can be sent back to the verifier agent 52 via the holder transaction agent 72 and verifier transaction agent 82.

The issuer transaction agent 62 sends to the holder transaction agent 72 the unlock signature for the locked credential associated with the data point proof associated with the signed transaction (step 1436) for relay to the verifier agent 52. The holder transaction agent 72 relays the unlock signature received from the issuer transaction agent 62 for the locked credential to the verifier transaction agent 82 (step 1438). The verifier transaction agent 82 sends to the verifier agent 52 the unlock signature received from the holder transaction agent 72 for the locked credential to unlock the data point proof associated with the signed transaction (step 1440). The verifier agent 52 subsequently unlocks the data point proof received from the holder agent 42 for the signed transaction using the unlock signature for the locked credential (step 1442).

The verifier agent 52 compares one or more data points included in the unlocked data point proof to particular values to verify, validate, or verify and validate the one or more data points, and the verifier agent 52 initiates the use of the service responsive to the verifying, validating, or verifying and validating the one or more data points (step 1443). For example, in the step 1443 the verifier agent 52 can verify or validate data points including one or more of a first name, last name, date of birth, credit card number, social security number, or passport number of a holder based on one or more criteria. The initiating of the service can include initiating (e.g., unlocking) a network-accessible service. The initiating a network-accessible service for example includes providing a benefit to a holder (e.g., a discount to a holder) or delivery of a digital or physical product or an online service.

The verifier agent 52 sends notification to the verifier transaction agent 82 that the transaction has completed successfully (step 1444) so that the verifier transaction agent 82 can relay the completed status, and so that the verifier transaction agent 82 can update the verified ledger 86 with the completed status. The verifier transaction agent 82 updates the verified ledger 86 with the completed status (step 1446). The verifier transaction agent 82 notifies the holder transaction agent 72 that the transaction has been completed (step 1448). The holder transaction agent 72 then updates the transaction ledger 76 with the completed status (step 1450).

The holder transaction agent 72 notifies the holder agent 42 that the transaction has been completed (step 1452), and the holder agent 42 may choose to show any updates to a user or system. The holder transaction agent 72 notifies the issuer transaction agent 62 that the transaction has been completed (step 1454), and the issuer transaction agent 62 updates the issuance ledger 66 with the completed status (step 1456).

Steps 1418, 1420, 1424, and 1428 provide additional levels of completeness that ensure that the SSI system 300 can detect issues and/or show progress throughout the flow sequence of the process flow and system 1400. A system implementation may choose to skip one or more of steps 1418, 1420, 1424, and 1428 for optimization purposes without losing the overall resultant exchange of a transaction.

The process flow and system 1600 enables a use case that provides a mechanism for a verifier (e.g., a merchant) to negotiate a discount code with an issuer of a credential type, to transmit the discount code to holders with one or more requirements for applying one or more discounts or other benefits. The one or more requirements include one or more indications of a conditional attestation per credential claim or per credential that must be true to receive the discount and to apply the discount to holders that present that credential type, or alternatively present a credential claim type of that credential type, as part of a verifiable proof response. While described with reference to a transaction code including a discount code, the process and flow system 1600 can be applied to other transaction codes associated with other benefits, for example a transaction code providing reward points. Referring to FIG. 10, the process flow and system 1600 is shown enabled in a network environment. A holder via the holder agent 42 (i.e., the fifth agent) wants to initiate a transaction for use of a service from a provider, and the provider acting as a verifier via the verifier agent 52 (i.e., the second agent) wants to verify the holder. As described herein, the provider may include a merchant or other entity enabled to deliver a network-enabled service which service may include initiation of delivery of digital or physical product or online service.

A verifier via the verifier transaction agent 82 requests a discount code and an encryption key directly from an issuer via an issuer transaction agent 62 (i.e., the third agent) without any context of holders that may use the verifier's services (step 1502). The verifier transaction agent 82 receives a response from the issuer transaction agent 62 to the discount code request which includes a discount code and a discount code encrypt key, for example a symmetric key or an asymmetric key (step 1504). The verifier transaction agent 82 forwards the discount code and the discount code encrypt key to the verifier agent 52 (step 1506). The verifier agent 52 applies the encrypt key to the discount code to generate a locked discount code (step 1508). Alternatively, the discount code is provided by the issuer transaction agent 62 as a locked discount code already encrypted by the encrypt key. Steps 1502, 1504, 1506, and 1508 are performed once, or periodically, or upon receipt by the verifier agent 52 of a new locked issuer credential discount code. The remaining steps 1602-1656 in the process flow and system 1600 are performed for each transaction in which a user requests a service via the holder agent 42.

The holder agent 42 requests the service from the verifier agent 52 (step 1602). The verifier agent 52 specifies to the holder agent 42 (e.g., in a presentation request) which one or more data points such as attributes (e.g., attributes of a verifiable credential) for the transaction are required in a request for data for the transaction and provides a per credential claim or per credential discount code and indicates one or more credential claim requirements indicating a conditional attestation per credential claim or per credential that must be true for the credential or credentials to be recognized by the verifier (step 1604).

The one or more data points for example define terms for the transaction (e.g., a contract) analogous to contract terms. Data points can include for example one or more of a holder's first name, last name, date of birth, credit card number, social security number, or passport number. One or more credential claims may fulfill the one or more data points specified in the step 1604, for example a credential claim can include one or more of a holder's first name, last name, date of birth, credit card number, social security number, or passport number. The holder agent 42 requests a verifiable credential from the issuer agent 22 (i.e., the sixth agent) responsive to the request for data from the verifier agent 52 (step 1606). The holder agent 42 does not need to disclose the identity of the verifier agent 52 in its request to the issuer agent 22, but the holder agent 42 can present the data points required by the verifier agent 52.

The holder agent 42 and issuer agent 22 interact (step 1608) in order to satisfy conditions that need to be met for the issuer agent 22 to be able to issue the requested verifiable credential based on the use case, type of credential, and assurance level. For example, for a know-your-client ("KYC") type verifiable credential, the holder of the holder agent 42 may be required to present their driver license or other identification on camera alongside their face. The issuer agent 22 sends to the holder agent 42 a locked credential (i.e., a verifiable credential that is locked) of the holder and a crypto commitment (step 1610), information that will allow a transaction agent to pay a fee for verification. The crypto commitment is related to the locked credential and includes information for the verifier agent 52 to use to contact the issuer agent 22. The crypto commitment can be provided as a partial signature for the locked credential guaranteeing the locked credential is usable by the holder agent 42 and enabling the verifier agent 52 to verify the locked credential after a payment or other requirement is completed via the verifier transaction agent 82. The crypto commitment can include cost and payment information regarding the cost of the locked credential.

The holder agent 42 transmits a response to the verifier agent 52 (e.g., a response to a presentation request) including one or more requirements on the data requested by the verifier agent 52 for fulfilling one or more data points for the transaction (e.g., a contract) to be initiated and including an acknowledgement of a discount associated with the discount code (step 1612). The one or more requirements provided by the holder agent 42 include for example one or more of price, a service level agreement ("SLA"), or policies for the data requested. If the one or more requirements are acceptable to the verifier agent 52, the verifier agent 52 responds by updating the transaction to generate a signed transaction that confirms that the one or more requirements are acceptable, and the verifier agent 52 transmits a response to the holder agent 42 including the signed transaction (step 1614). The signed transaction includes data of the issuer agent 22 (e.g., digital identity of the issuer agent 22).

The signed (i.e., "updated") transaction obtained by the holder agent 42 from the verifier agent 52 in step 1614, including data of the issuer agent 22 (e.g., digital identity of the issuer agent 22), and the crypto commitment obtained by the holder agent 42 from the issuer agent 22 in step 1610 are sent by the holder agent 42 to the holder transaction agent 72 (i.e., the fourth agent) (step 1616). The holder transaction agent 72 beneficially verifies the signature of the signed transaction, for example by applying a public key associated with the verifier agent 52 (step 1617). The signed (i.e., "updated") transaction received by the holder transaction agent 72 from the holder agent 42 in the step 1616 is written to the transaction ledger 76 by the holder transaction agent 72 (step 1618). Confirmation of storing of the signed transaction on the transaction ledger 76 is transmitted by the holder transaction agent 72 to the holder agent 42 (step 1620). The holder agent 42 sends the verifier agent 52 a locked verifiable proof, based on the locked credential (e.g., including the locked credential), including the one or more data points ("data point proof") requested by the verifier agent 52 and one or more verifiable per credential claim attestations (step 1622). The data point proof includes a presentation of the requested one or more data points and one or more locked proofs associated with the requested one or more data points.

The verifier agent 52 determines if the presentation includes one or more credential claim attestations matching conditional logic for each discount code required to apply the discount, and the verifier agent 52 applies the discount to the transaction using the discount code if the one or more credential attestations match the conditional logic for each discount code (step 1623). For example, the discount code or other transaction code provides for a discount or benefit proportional to the number of credential claims in one or more credentials meeting a particular criterion or criteria as indicated in a credential claim attestation received from the holder agent 42. By the step 1623, the verifier agent 52 ensures that the holder agent 42 provides a credential or a claim of a credential from the issuer that had agreed with the verifier via the verifier transaction agent 82 to provide the discount code for the credential type or the credential claim type and had provided via the issuer transaction agent 62 the discount code encrypt key to the verifier transaction agent 82 in the step 1504.

The holder agent 42 confirms to the holder transaction agent 72 the fact that the verifier agent 52 was sent the data point proof (step 1624), thus unblocking the payment part of the transaction by action of the holder transaction agent 72. The verifier agent 52 sends to the verifier transaction agent 82 (i.e., the first agent) the signed transaction, the data point proof received from the holder agent 42, and the applied discount code (step 1626).

The verifier transaction agent 82 saves the signed transaction and the data point proof to a verified ledger 86 (step 1628) to trigger payment initiation. The verifier transaction agent 82 sends payment and proof of the payment for the issuer agent 22 and the applied discount code to the holder transaction agent 72 (step 1630). The holder transaction agent 72 deidentifies the payment and proof of the payment, and the payment and proof of the payment for the issuer agent 22 ("payment proof") and the applied discount code, which do not disclose the payer's identity, are relayed to the issuer transaction agent 62 (i.e., the third agent) by the holder transaction agent 72 (step 1632). The issuer transaction agent 62 saves the payment proof to the issuance ledger 66 (step 1634) so that an unlock signature for the locked credential as associated with the data point proof can be sent back to the verifier agent 52 via the holder transaction agent 72 and verifier transaction agent 82.

The issuer transaction agent 62 sends to the holder transaction agent 72 the unlock signature for the locked credential associated with the data point proof associated with the signed transaction (step 1636) for relay to the verifier agent 52. The holder transaction agent 72 relays the unlock signature received from the issuer transaction agent 62 for the locked credential to the verifier transaction agent 82 (step 1638). The verifier transaction agent 82 sends to the verifier agent 52 the unlock signature received from the holder transaction agent 72 for the locked credential to unlock the data point proof associated with the signed transaction (step 1640). The verifier agent 52 subsequently unlocks the data point proof received from the holder agent 42 for the signed transaction using the unlock signature for the locked credential (step 1642).

The verifier agent 52 compares one or more data points included in the unlocked data point proof to particular values to verify, validate, or verify and validate the one or more data points, and the verifier agent 52 initiates the use of the service responsive to the verifying, validating, or verifying and validating the one or more data points (step 1643). For example, in the step 1643 the verifier agent 52 can verify or validate data points including one or more of a first name, last name, date of birth, credit card number, social security number, or passport number of a holder based on one or more criteria. The initiating of the service can include initiating (e.g., unlocking) a network-accessible service. The initiating a network-accessible service for example includes providing a benefit to a holder (e.g., a discount to a holder) or delivery of a digital or physical product or an online service.

The verifier agent 52 sends notification to the verifier transaction agent 82 that the transaction has completed successfully (step 1644) so that the verifier transaction agent 82 can relay the completed status, and so that the verifier transaction agent 82 can update the verified ledger 86 with the completed status. The verifier transaction agent 82 updates the verified ledger 86 with the completed status (step 1646). The verifier transaction agent 82 notifies the holder transaction agent 72 that the transaction has been completed (step 1648). The holder transaction agent 72 then updates the transaction ledger 76 with the completed status (step 1650).

The holder transaction agent 72 notifies the holder agent 42 that the transaction has been completed (step 1652), and the holder agent 42 may choose to show any updates to a user or system. The holder transaction agent 72 notifies the issuer transaction agent 62 that the transaction has been completed (step 1654), and the issuer transaction agent 62 updates the issuance ledger 66 with the completed status (step 1656).

Steps 1618, 1620, 1624, and 1628 provide additional levels of completeness that ensure that the SSI system 300 can detect issues and/or show progress throughout the flow sequence of the process flow and system 1600. A system implementation may choose to skip one or more of steps 1618, 1620, 1624, and 1628 for optimization purposes without losing the overall resultant exchange of a transaction.

Further to the description above and referring to FIGS. 8, 9, and 10, the process flows and systems 1200, 1400, and 1600 enable a fourth method for transacting over a computer network by a plurality of agents including a first agent, second agent, third agent, fourth agent, fifth agent, and sixth agent. The fourth method is described with reference to the steps and elements of the process flows and systems 1200, 1400, and 1600 wherein the first agent is depicted as a verifier transaction agent 82, the second agent is depicted as a verifier agent 52, the third agent is depicted as an issuer transaction agent 62, the fourth agent is depicted as a holder transaction agent 72, the fifth agent is depicted as a holder agent 42, and the sixth agent is depicted as an issuer agent 22. The depictions of the plurality of agents with respect to the process flows and systems 1200, 1400, and 1600 are exemplary in nature, and the process flows and systems 1200, 1400, and 1600 are not limited by the particular naming of each agent.

The fourth method for transacting over a network includes receiving by a verifier transaction agent 82 (i.e., the first agent) from an issuer transaction agent 62 (i.e., the third agent) a transaction code associated with one or more credential types required to apply the transaction code or with one or more credential claim types required to apply the transaction code (steps 1104, 1304, 1504). The verifier transaction agent 82 transmits the transaction code to a verifier agent 52 (i.e., the second agent) (steps 1106, 1306, 1506). The verifier transaction agent 82 receives from the verifier agent 52 a digitally signed transaction, a first verifiable proof, and the transaction code (steps 1226, 1426, 1626). The verifier transaction agent 82 transmits to a holder transaction agent 72 (i.e., the fourth agent) a second verifiable proof (e.g., a payment proof) based on the first verifiable proof and the transaction code (steps 1230, 1430, 1630). The verifier transaction agent 82 receives from the holder transaction agent 72 an unlock signature for a locked credential including one or more credential claims (steps 1238, 1438, 1638) and transmits the unlock signature to the verifier agent 52 (steps 1240, 1440, 1640).

The fourth method further includes receiving by the verifier agent 52 from a holder agent 42 (i.e., the fifth agent) a request to initiate a use of a network-accessible service (steps 1202, 1402, 1602). The verifier agent 52 transmits to the holder agent 42 a request for one or more data points that support verification of an entity to initiate the use of the network-accessible service (steps 1204, 1404, 1604). The verifier agent 52 receives from the holder agent 42 the first verifiable proof, the first verifiable proof based on the locked credential or the one or more credential claims of the locked credential and including the one or more data points (steps 1222, 1422, 1622). The verifier agent 52 compares the locked credential to the one or more credential types required to apply the transaction code or compares the one or more credential claims of the locked credential to the one or more credential claim types required to apply the transaction code to determine that the locked credential matches the one or more credential types required to apply the transaction code or to determine that the one or more credential claims of the locked credential matches the one or more credential claim types required to apply the transaction code (steps 1223, 1423, 1623). The verifier agent 52 applies the transaction code to the digitally signed transaction responsive to the determining that the locked credential matches the one or more credential types required to apply the transaction code or the one or more credential claims of the locked credential matches the one or more credential claim types required to apply the transaction code (steps 1223, 1423, 1623) and unlocks the first verifiable proof using the unlock signature (steps 1242, 1442, 1642).

In the fourth method, the verifier transaction agent 82 receives an encryption key from the issuer transaction agent 62 (steps 1104, 1304, 1504) and transmits the encryption key to the verifier agent 52 (steps 1106, 1306, 1506). The verifier agent 52 can encrypt the transaction code with the encryption key to generate an encrypted code (steps 1108, 1308, 1508). The verifier agent 52 can transmit the encrypted ("locked") code to the holder agent 42 (step 1404) and receive from the holder agent 42 a decrypted code based on the encrypted code (step 1422). The verifier agent 52 can compare the decrypted code to the transaction code to determine that the decrypted code matches the transaction code (step 1423) and apply the transaction code to the digitally signed transaction further responsive to the determining the decrypted code matches the transaction code (step 1423). The holder agent 42 can receive the encrypted code from the verifier agent 52 (step 1404), transmit a credential request to an issuer agent 22 (i.e., the sixth agent) responsive to the request for the one or more data points from the verifier agent 52 (step 1406), and receive the locked credential and a decryption key from the issuer agent 22 (step 1410). The holder agent 42 can further decrypt the encrypted code using the decryption key to generate the decrypted code (step 1411), generate the first verifiable proof based on the locked credential (step 1422), and transmit the first verifiable proof and the decrypted code to the verifier agent 52 (step 1422). The holder transaction agent 72 can transmit to the issuer transaction agent 62 the second verifiable proof (step 1432) and receive from the issuer transaction agent 62 the unlock signature (step 1436).

In the fourth method the second verifiable proof can include a proof of a payment. The transaction code can include a benefit applied to the digitally signed transaction, for example reward points applied to the digitally signed transaction or a discount code associated with the payment.

In the fourth method, the transaction code can be conditionally associated with a plurality of benefits. In a particular implementation, the verifier agent 52 transmits to the holder agent 42 an indication of a plurality of credential claim requirements associated with the plurality of benefits (step 1604) and receives one or more verifiable credential claim attestations from the holder agent 42 (step 1622). The verifier agent 52 compares the one or more verifiable credential claim attestations to the plurality of credential claim requirements to determine one or more of the plurality of benefits and applies the transaction code to the digitally signed transaction based on the determining the one or more of the plurality of benefits (step 1623).

In the fourth method, the verifier agent 52 verifies, validates, or verifies and validates the one or more data points after unlocking the first verifiable proof using the unlock signature, and the verifier agent 52 initiates the use of the network-accessible service responsive to the determining that the locked credential matches the one or more credential types required to apply the transaction code or the verifying or responsive to the validating the one or more data points (steps 1243, 1443, 1643). Alternatively, the verifier agent 52 initiates the use of the network-accessible service responsive to the determining that the locked credential matches the one or more credential types required to apply the transaction code and the verifying or the validating the one or more data points (steps 1243, 1443, 1643). Alternatively, the verifier agent 52 initiates the use of the network-accessible service responsive to one or more of the determining that the locked credential matches the one or more credential types required to apply the transaction code, determining the one or more credential claims of the locked credential match the one or more credential claim types required to apply the transaction code, or the verifying or the validating the one or more data points (steps 1243, 1443, 1643).

In the fourth method, the verifier agent 52 can receive from the holder agent 42 one or more requirements for fulfilling the one or more data points (steps 1212, 1412, 1612). The verifier agent 52 can generate the digitally signed transaction responsive to receiving the one or more requirements from the holder agent 42, and the verifier agent 52 can transmit the digitally signed transaction to the holder agent 42 (steps 1214, 1414, 1614). The holder transaction agent 72 can receive the digitally signed transaction from the holder agent 42 (steps 1216, 1416, 1616), cryptographically verify the digitally signed transaction (steps 1217, 1417, 1617), transmit the second verifiable proof to the issuer transaction agent 62 responsive to the cryptographically verifying the digitally signed transaction (steps 1232, 1432, 1632), and receive the unlock signature from the issuer transaction agent 62. The holder transaction agent 72 is further operable to deidentify the second verifiable proof prior to transmitting the second verifiable proof to the issuer transaction agent 62 (steps 1232, 1432, 1632).

Further to the description above and referring to FIGS. 8, 9, and 10, the process flows and systems 1200, 1400, and 1600 enable a fifth method for transacting over a computer network with a plurality of agents including a first agent and a second agent. The fifth method is described with reference to the steps and elements of the process flows and systems 1200, 1400, and 1600 wherein the first agent is depicted as a verifier transaction agent 82, the second agent is depicted as a holder agent 42, and wherein the verifier agent 52 performs the fifth method. The depictions of the plurality of agents with respect to the process flows and systems 1200, 1400, and 1600 are exemplary in nature, and the process flows and systems 1200, 1400, and 1600 are not limited by the particular naming of each agent.

The fifth method includes receiving by a verifier agent 52 from a verifier transaction agent 82 ("first agent") a transaction code associated with one or more credential types required to apply the transaction code or with one or more credential claim types required to apply the transaction code (steps 1106, 1306, 1506) and receiving by the verifier agent 52 from a holder agent 42 ("second agent") a request to initiate a use of a network-accessible service (steps 1202, 1402, 1602). The method further includes transmitting by the verifier agent 52 to the holder agent 42 a request for one or more data points that support verification of an entity to initiate the use of the network-accessible service (steps 1204, 1404, 1604) and generating by the verifier agent 52 a digitally signed transaction for the request to initiate the use of the network-accessible service (steps 1214, 1414, 1614). The verifier agent 52 receives from the holder agent 42 a first verifiable proof, the first verifiable proof based on a locked credential comprising one or more credential claims, and the first verifiable proof including the one or more data points (steps 1222, 1422, 1622). The verifier agent 52 compares the locked credential to the one or more credential types required to apply the transaction code or compares the one or more credential claims of the locked credential to the one or more credential claim types required to apply the transaction code to determine that the locked credential matches the one or more credential types required to apply the transaction code or to determine that the one or more credential claims of the locked credential match the one or more credential claim types required to apply the transaction code (steps 1223, 1423, 1623). The verifier agent 52 applies the transaction code to the digitally signed transaction responsive to the determining that the locked credential matches the one or more credential types required to apply the transaction code or the one or more credential claims of the locked credential match the one or more credential claim types required to apply the transaction code (steps 1223, 1423, 1623). The verifier agent 52 transmits to the verifier transaction agent 82 the digitally signed transaction, the first verifiable proof, and the transaction code (steps 1226, 1426, 1626). The verifier agent 52 receives from the verifier transaction agent 82 an unlock signature for the locked credential (steps 1240, 1440, 1640), and the verifier agent 52 unlocks the first verifiable proof using the unlock signature (steps 1242, 1442, 1642).

The fifth method can further include receiving by the verifier agent 52 from the holder agent 42 one or more requirements for fulfilling the one or more data points (steps 1212, 1412, 1612), and generating by the verifier agent 52 the digitally signed transaction responsive to receiving the one or more requirements from the holder agent 42 (steps 1214, 1414, 1614).

In an implementation of the fifth method, the verifier agent 52 receives an encryption key from the verifier transaction agent 82 (steps 1106, 1306, 1506) and encrypts the transaction code with the encryption key to generate an encrypted code (steps 1108, 1308, 1508). The verifier agent 52 transmits the encrypted code to the holder agent 42 (step 1404) and receives from the holder agent 42 a decrypted code based on the encrypted code (step 1422). The verifier agent 52 compares the decrypted code to the transaction code to determine that the decrypted code matches the transaction code (step 1423) and applies the transaction code to the digitally signed transaction further responsive to the determining the decrypted code matches the transaction code (step 1423).

In the fifth method, the transaction code can include a benefit applied to the digitally signed transaction. In another implementation of the fifth method, the transaction code is conditionally associated with a plurality of benefits. The verifier agent 52 transmits to the holder agent an indication of a plurality of credential claim requirements associated with the plurality of benefits (step 1604) and receives one or more verifiable credential claim attestations from the holder agent 42 (step 1622). The verifier agent 52 compares the one or more verifiable credential claim attestations to the plurality of conditional associations to determine one or more of the plurality of benefits (step 1623) and applies the transaction code to the digitally signed transaction based on the determining the one or more of the plurality of benefits (step 1623).

In the fifth method, the verifier agent 52 verifies, validates, or verifies and validates the one or more data points after unlocking the first verifiable proof using the unlock signature, and the verifier agent 52 initiates the use of the network-accessible service responsive to the determining that the locked credential matches the one or more credential types required to apply the transaction code or the verifying, validating, or verifying and validating the one or more data points (steps 1243, 1443, 1643). Alternatively, the verifier agent 52 initiates the use of the network-accessible service responsive to the determining that the locked credential matches the one or more credential types required to apply the transaction code and the verifying, validating, or verifying and validating the one or more data points (steps 1243, 1443, 1643). Alternatively, the verifier agent 52 initiates the use of the network-accessible service responsive to one or more of the determining that the locked credential matches the one or more credential types required to apply the transaction code, determining the one or more credential claims of the locked credential match the one or more credential claim types required to apply the transaction code, or the verifying or the validating the one or more data points (steps 1243, 1443, 1643).

FIG. 11 illustrates in abstract the function of an exemplary computer system 2000 on which the systems, methods and processes described herein can execute. For example, the issuer system 20, holder device 40, verifier system 50, issuer transaction agent service provider system 60, holder transaction agent service provider system 70, and verifier transaction agent service provider system 80, can each be embodied by a particular computer system 2000. The computer system 2000 may be provided in the form of a personal computer, laptop, handheld mobile communication device, mainframe, distributed computing system, or other suitable computer configuration. Illustrative subject matter is in some instances described herein as computer-executable instructions, for example in the form of program modules, which program modules can include programs, routines, objects, data structures, components, or architecture configured to perform particular tasks or implement particular abstract data types. The computer-executable instructions are represented for example by instructions 2024 executable by the computer system 2000.

The computer system 2000 can operate as a standalone device or can be connected (e.g., networked) to other machines. In a networked deployment, the computer system 2000 may operate in the capacity of a server or a client machine in a server-client network environment, or as a peer machine in a peer-to-peer (or distributed) network environment. The computer system 2000 can also be considered to include a collection of machines that individually or jointly execute a set (or multiple sets) of instructions to perform one or more of the methodologies described herein.

It would be understood by those skilled in the art that other computer systems including but not limited to networkable personal computers, minicomputers, mainframe computers, handheld mobile communication devices, multiprocessor systems, microprocessor-based or programmable electronics, and smart phones could be used to enable the systems, methods and processes described herein. Such computer systems can moreover be configured as distributed computer environments where program modules are enabled and tasks are performed by processing devices linked through a computer network, and in which program modules can be located in both local and remote memory storage devices.

The exemplary computer system 2000 includes a processor 2002, for example a central processing unit (CPU) or a graphics processing unit (GPU), a main memory 2004, and a static memory 2006 in communication via a bus 2008. A visual display 2010 for example a liquid crystal display (LCD), light emitting diode (LED) display or a cathode ray tube (CRT) is provided for displaying data to a user of the computer system 2000. The visual display 2010 can be enabled to receive data input from a user, for example via a resistive or capacitive touch screen. A character input apparatus 2012 can be provided for example in the form of a physical keyboard, or alternatively, a program module which enables a user-interactive simulated keyboard on the visual display 2010 and actuatable for example using a resistive or capacitive touchscreen. An audio input apparatus 2013, for example a microphone, enables audible language input which can be converted to textual input by the processor 2002 via the instructions 2024. A pointing/selecting apparatus 2014 can be provided, for example in the form of a computer mouse or enabled via a resistive or capacitive touch screen in the visual display 2010. A data drive 2016, a signal generator 2018 such as an audio speaker, and a network interface 2020 can also be provided. A location determining system 2017 is also provided which can include for example a GPS receiver and supporting hardware.

The instructions 2024 and data structures embodying or used by the herein-described systems, methods, and processes, for example software instructions, are stored on a computer-readable medium 2022 and are accessible via the data drive 2016. Further, the instructions 2024 can completely or partially reside for a particular time period in the main memory 2004 or within the processor 2002 when the instructions 2024 are executed. The main memory 2004 and the processor 2002 are also as such considered computer-readable media.

While the computer-readable medium 2022 is shown as a single medium, the computer-readable medium 2022 can be considered to include a single medium or multiple media, for example in a centralized or distributed database, or associated caches and servers, that store the instructions 2024. The computer-readable medium 2022 can be considered to include any tangible medium that can store, encode, or carry instructions for execution by a machine and that cause the machine to perform any one or more of the methodologies described herein, or that can store, encode, or carry data structures used by or associated with such instructions.

Further, the term "computer-readable storage medium" can be considered to include, but is not limited to, solid-state memories and optical and magnetic media that can store information in a non-transitory manner. Computer-readable media can for example include non-volatile memory such as semiconductor memory devices (e.g., magnetic disks such as internal hard disks and removable disks, magneto-optical disks, CD-ROM and DVD-ROM disks, Erasable Programmable Read-Only Memory (EPROM), Electrically Erasable Programmable Read-Only Memory (EEPROM), and flash memory devices).

The instructions 2024 can be transmitted or received over a computer network using a signal transmission medium via the network interface 2020 operating under one or more known transfer protocols, for example FTP, HTTP, or HTTPs. Examples of computer networks include a local area network (LAN), a wide area network (WAN), the internet, mobile telephone networks, Plain Old Telephone (POTS) networks, and wireless data networks, for example Wi-Fi™ and 3G/4G/5G cellular networks. The term "computer-readable signal medium" can be considered to include any transitory intangible medium that is capable of storing, encoding, or carrying instructions for execution by a machine, and includes digital or analog communications signals or other intangible medium to facilitate communication of such instructions.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A system for transacting over a network, the system comprising a first agent and a second agent, the first agent operable to:
   receive from a third agent a transaction code associated with at least one credential type required to apply the transaction code;
   transmit the transaction code to the second agent;
   receive from the second agent a digitally signed transaction, a first verifiable proof, and the transaction code;
   transmit to a fourth agent a second verifiable proof based on the first verifiable proof and the transaction code;
   receive from the fourth agent an unlock signature for a locked credential; and
   transmit the unlock signature to the second agent; and
   the second agent operable to:
   receive from a fifth agent a request to initiate a use of a network-accessible service;
   transmit to the fifth agent a request for at least one data point that supports verification of an entity to initiate the use of the network-accessible service;
   receive from the fifth agent the first verifiable proof, the first verifiable proof based on the locked credential and comprising the at least one data point;
   compare the locked credential to the at least one credential type required to apply the transaction code to determine that the locked credential matches the at least one credential type required to apply the transaction code;
apply the transaction code to the digitally signed transaction responsive to the determining that the locked credential matches the at least one credential type required to apply the transaction code; and
unlock the first verifiable proof using the unlock signature.

2. The system of claim 1, the first agent further operable to:
receive an encryption key from the third agent;
transmit the encryption key to the second agent;
the second agent further operable to:
encrypt the transaction code with the encryption key to generate an encrypted code;
transmit the encrypted code to the fifth agent;
receive from the fifth agent a decrypted code based on the encrypted code;
compare the decrypted code to the transaction code to determine that the decrypted code matches the transaction code; and
apply the transaction code to the digitally signed transaction further responsive to the determining the decrypted code matches the transaction code.

3. The system of claim 2, further comprising the fifth agent, the fifth agent operable to:
receive the encrypted code from the second agent;
transmit a credential request to a sixth agent responsive to the request for the at least one data point from the second agent;
receive the locked credential and a decryption key from the sixth agent;
decrypt the encrypted code using the decryption key to generate the decrypted code;
generate the first verifiable proof based on the locked credential; and
transmit the first verifiable proof and the decrypted code to the second agent.

4. The system of claim 3, further comprising the fourth agent, the fourth agent further operable to:
transmit to the third agent the second verifiable proof; and
receive from the third agent the unlock signature.

5. The system of claim 1, wherein:
the second verifiable proof comprises a proof of a payment; and
the transaction code comprises a benefit applied to the digitally signed transaction.

6. The system of claim 1, wherein:
the second verifiable proof comprises a proof of a payment; and
the transaction code comprises reward points applied to the digitally signed transaction.

7. The system of claim 1, wherein:
the second verifiable proof comprises a proof of a payment; and
the transaction code comprises a discount code associated with the payment.

8. The system of claim 1, wherein the transaction code is conditionally associated with a plurality of benefits, the second agent further operable to:
transmit to the fifth agent an indication of a plurality of credential claim requirements associated with the plurality of benefits;
receive one or more verifiable credential claim attestations from the fifth agent;
compare the one or more verifiable credential claim attestations to the plurality of credential claim requirements to determine one or more of the plurality of benefits; and
apply the transaction code to the digitally signed transaction based on the determining the one or more of the plurality of benefits.

9. The system of claim 1, wherein:
the second verifiable proof comprises a proof of a payment;
the transaction code comprises a discount code associated with the payment;
the discount code is conditionally associated with a plurality of discounts; and
the second agent is further operable to:
transmit to the fifth agent an indication of a plurality of conditional associations of the plurality of discounts;
receive one or more verifiable credential claim attestations from the fifth agent;
compare the one or more verifiable credential claim attestations to the plurality of conditional associations to determine one or more of the plurality of discounts; and
apply the transaction code to the digitally signed transaction based on the determining the one or more of the plurality of discounts.

10. The system of claim 1, the second agent further operable to at least one of verify or validate the at least one data point after unlocking the first verifiable proof using the unlock signature.

11. The system of claim 10, the second agent further operable to initiate the use of the network-accessible service responsive to the at least one of the verifying or the validating the at least one data point.

12. The system of claim 10, the second agent further operable to initiate the use of the network-accessible service responsive to at least one of the determining that the locked credential matches the at least one credential type required to apply the transaction code or the at least one of the verifying or the validating the at least one data point.

13. The system of claim 1, the second agent further operable to initiate the use of the network-accessible service responsive to the determining that the locked credential matches the at least one credential type required to apply the transaction code.

14. The system of claim 1, wherein the at least one credential type comprises a plurality of credential types.

15. The system of claim 1, the second agent further operable to:
receive from the fifth agent at least one requirement for fulfilling the at least one data point; and
generating the digitally signed transaction responsive to receiving the at least one requirement from the fifth agent.

16. The system of claim 1, the second agent further operable to transmit the digitally signed transaction to the fifth agent, the system further comprising the fourth agent, the fourth agent operable to:
receive the digitally signed transaction from the fifth agent;
cryptographically verify the digitally signed transaction;
transmit the second verifiable proof to the third agent responsive to the cryptographically verifying the digitally signed transaction; and
receive the unlock signature from the third agent.

17. The system of claim 16, the fourth agent further operable to deidentify the second verifiable proof prior to transmitting the second verifiable proof to the third agent.

18. A method for transacting over a network, the method comprising:
- receiving by a first agent from a third agent a transaction code associated with at least one credential type required to apply the transaction code or with at least one credential claim type required to apply the transaction code;
- transmitting by the first agent the transaction code to a second agent;
- receiving by the first agent from the second agent a digitally signed transaction, a first verifiable proof, and the transaction code;
- transmitting by the first agent to a fourth agent a second verifiable proof based on the first verifiable proof and the transaction code;
- receiving by the first agent from the fourth agent an unlock signature for a locked credential comprising at least one credential claim;
- transmitting by the first agent the unlock signature to the second agent;
- receiving by the second agent from a fifth agent a request to initiate a use of a network-accessible service;
- transmitting by the second agent to the fifth agent a request for at least one data point that supports verification of an entity to initiate the use of the network-accessible service;
- receiving by the second agent from the fifth agent the first verifiable proof, the first verifiable proof based on the locked credential or the at least one credential claim of the locked credential and comprising the at least one data point;
- comparing by the second agent the locked credential to the at least one credential type required to apply the transaction code or the at least one credential claim of the locked credential to the at least one credential claim type required to apply the transaction code to determine that the locked credential matches the at least one credential type required to apply the transaction code or to determine that the at least one credential claim of the locked credential matches the at least one credential claim type required to apply the transaction code;
- applying by the second agent the transaction code to the digitally signed transaction responsive to the determining that the locked credential matches the at least one credential type required to apply the transaction code or the at least one credential claim of the locked credential matches the at least one credential claim type required to apply the transaction code; and
- unlocking by the second agent the first verifiable proof using the unlock signature.

19. The method of claim 18, further comprising:
- receiving by the first agent an encryption key from the third agent;
- transmitting by the first agent the encryption key to the second agent;
- encrypting by the second agent the transaction code with the encryption key to generate an encrypted code;
- transmitting by the second agent the encrypted code to the fifth agent;
- receive by the second agent from the fifth agent a decrypted code based on the encrypted code;
- comparing by the second agent the decrypted code to the transaction code to determine that the decrypted code matches the transaction code; and
- apply by the second agent the transaction code to the digitally signed transaction further responsive to the determining the decrypted code matches the transaction code.

20. The method of claim 18, further comprising at least one of verifying or validating by the second agent the at least one data point after unlocking the first verifiable proof using the unlock signature.

21. The method of claim 20, further comprising initiating by the second agent the use of the network-accessible service responsive to at least one of the determining that the locked credential matches the at least one credential type required to apply the transaction code or the at least one of the verifying or the validating the at least one data point.

22. A method for transacting over a network, the method comprising:
- receiving from a first agent a transaction code associated with at least one credential type required to apply the transaction code;
- receiving from a second agent a request to initiate a use of a network-accessible service;
- transmitting to the second agent a request for at least one data point that supports verification of an entity to initiate the use of the network-accessible service;
- generating a digitally signed transaction for the request to initiate the use of the network-accessible service;
- receiving from the second agent a first verifiable proof, the first verifiable proof based on a locked credential and comprising the at least one data point;
- comparing the locked credential to the at least one credential type required to apply the transaction code to determine that the locked credential matches the at least one credential type required to apply the transaction code;
- applying the transaction code to the digitally signed transaction responsive to the determining that the locked credential matches the at least one credential type required to apply the transaction code;
- transmitting to the first agent the digitally signed transaction, the first verifiable proof, and the transaction code;
- receiving from the first agent an unlock signature for the locked credential; and
- unlocking the first verifiable proof using the unlock signature.

23. The method of claim 20, further comprising:
- receiving from the second agent at least one requirement for fulfilling the at least one data point; and
- generating the digitally signed transaction responsive to receiving the at least one requirement from the second agent.

24. The method of claim 22, further comprising:
- receiving an encryption key from the first agent;
- encrypting the transaction code with the encryption key to generate an encrypted code;
- transmitting the encrypted code to the second agent;
- receiving from the second agent a decrypted code based on the encrypted code;
- comparing the decrypted code to the transaction code to determine that the decrypted code matches the transaction code; and
- applying the transaction code to the digitally signed transaction further responsive to the determining the decrypted code matches the transaction code.

25. The method of claim 22, wherein the transaction code comprises a benefit applied to the digitally signed transaction.

26. The method of claim 22, wherein the transaction code is conditionally associated with a plurality of benefits, the method further comprising:
- transmitting to the second agent an indication of a plurality of credential claim requirements associated with the plurality of benefits;
- receiving one or more verifiable credential claim attestations from the second agent;
- comparing the one or more verifiable credential claim attestations to the plurality of credential claim requirements to determine one or more of the plurality of benefits; and
- applying the transaction code to the digitally signed transaction based on the determining the one or more of the plurality of benefits.

27. The method of claim 22, further comprising at least one of verifying or validating the at least one data point after unlocking the first verifiable proof using the unlock signature.

28. The method of claim 27, further comprising initiating the use of the network-accessible service responsive to at least one of the determining that the locked credential matches the at least one credential type required to apply the transaction code or the at least one of the verifying or the validating the at least one data point.

29. A system for transacting over a network, the system comprising a first agent and a second agent, the first agent operable to:
- receive from a third agent a transaction code associated with at least one credential type required to apply the transaction code or with at least one credential claim type required to apply the transaction code;
- transmit the transaction code to the second agent;
- receive from the second agent a digitally signed transaction, a first verifiable proof, and the transaction code;
- transmit to a fourth agent a second verifiable proof based on the first verifiable proof and the transaction code;
- receive from the fourth agent an unlock signature for a locked credential comprising at least one credential claim; and
- transmit the unlock signature to the second agent; and the second agent operable to:
- receive from a fifth agent a request to initiate a use of a network-accessible service;
- transmit to the fifth agent a request for at least one data point that supports verification of an entity to initiate the use of the network-accessible service;
- receive from the fifth agent the first verifiable proof, the first verifiable proof based on the locked credential or the at least one credential claim of the locked credential and comprising the at least one data point;
- compare the locked credential to the at least one credential type required to apply the transaction code or the at least one credential claim of the locked credential to the at least one credential claim type required to apply the transaction code to determine that the locked credential matches the at least one credential type required to apply the transaction code or to determine that the at least one credential claim of the locked credential matches the at least one credential claim type required to apply the transaction code;
- apply the transaction code to the digitally signed transaction responsive to the determining that the locked credential matches the at least one credential type required to apply the transaction code or the at least one credential claim of the locked credential matches the at least one credential claim type required to apply the transaction code; and
- unlock the first verifiable proof using the unlock signature.

30. The system of claim 29, wherein the transaction code is conditionally associated with a plurality of benefits, the second agent further operable to:
- transmit to the fifth agent an indication of a plurality of credential claim requirements associated with the plurality of benefits;
- receive one or more verifiable credential claim attestations from the fifth agent;
- compare the one or more verifiable credential claim attestations to the plurality of credential claim requirements to determine one or more of the plurality of benefits; and
- apply the transaction code to the digitally signed transaction based on the determining the one or more of the plurality of benefits.

31. The system of claim 29, the second agent further operable to:
- at least one of verify or validate the at least one data point after unlocking the first verifiable proof using the unlock signature; and
- initiate the use of the network-accessible service responsive to at least one of the determining that the locked credential matches the at least one credential type required to apply the transaction code or the at least one credential claim of the locked credential matches the at least one credential claim type required to apply the transaction code or the at least one of the verifying or the validating the at least one data point.

32. A method for transacting over a network, the method comprising:
- receiving from a first agent a transaction code associated with at least one credential type required to apply the transaction code or with at least one credential claim type required to apply the transaction code;
- receiving from a second agent a request to initiate a use of a network-accessible service;
- transmitting to the second agent a request for at least one data point that supports verification of an entity to initiate the use of the network-accessible service;
- generating a digitally signed transaction for the request to initiate the use of the network-accessible service;
- receiving from the second agent a first verifiable proof, the first verifiable proof based on a locked credential comprising one or more credential claim, and the first verifiable proof comprising the at least one data point;
- comparing the locked credential to the at least one credential type required to apply the transaction code or the at least one credential claim of the locked credential to the at least one credential claim type required to apply the transaction code to determine that the locked credential matches the at least one credential type required to apply the transaction code or to determine that the at least one credential claim of the locked credential matches the at least one credential claim type required to apply the transaction code;
- applying the transaction code to the digitally signed transaction responsive to the determining that the locked credential matches the at least one credential type required to apply the transaction code or the at least one credential claim of the locked credential matches the at least one credential claim type required to apply the transaction code;

transmitting to the first agent the digitally signed transaction, the first verifiable proof, and the transaction code;

receiving from the first agent an unlock signature for the locked credential; and unlocking the first verifiable proof using the unlock signature.

* * * * *